(12) United States Patent
Boily

(10) Patent No.: US 10,750,665 B1
(45) Date of Patent: Aug. 25, 2020

(54) METER ROLLER SYSTEM

(71) Applicant: CNH Industrial Canada, Ltd., Saskatoon (CA)

(72) Inventor: Guillaume Cloutier Boily, Martensville (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 0 days.

(21) Appl. No.: 16/265,794

(22) Filed: Feb. 1, 2019

(51) Int. Cl.
*A01C 23/00* (2006.01)

(52) U.S. Cl.
CPC .......... *A01C 23/007* (2013.01); *A01C 23/008* (2013.01)

(58) Field of Classification Search
CPC ...... A01C 23/007; A01C 23/00; A01C 23/008
See application file for complete search history.

(56) References Cited

U.S. PATENT DOCUMENTS

| | | | |
|---|---|---|---|
| 1,134,894 A * | 4/1915 | Newton | A01C 7/04 111/178 |
| 3,704,816 A | 12/1972 | Gandrud | |
| 4,705,220 A | 11/1987 | Gandrud et al. | |
| 4,921,144 A * | 5/1990 | Vardar | A01C 7/18 111/93 |
| 5,845,818 A | 12/1998 | Gregor et al. | |
| 5,996,515 A | 12/1999 | Gregor et al. | |
| 6,138,591 A | 10/2000 | Horsch | |
| 6,158,630 A | 12/2000 | Mayerle et al. | |
| 7,083,069 B2 | 8/2006 | Wysong et al. | |
| 7,765,943 B2 | 8/2010 | Landphair et al. | |
| 8,701,575 B2 | 4/2014 | Friggstad | |
| 8,701,576 B2 | 4/2014 | Friggstad | |
| 9,043,949 B2 | 6/2015 | Liu et al. | |
| 9,265,188 B2 | 2/2016 | Thompson et al. | |
| 9,497,899 B2 | 11/2016 | Glowa et al. | |
| 9,801,330 B2 | 10/2017 | Bent et al. | |
| 9,844,174 B2 | 12/2017 | Gervais et al. | |
| 9,907,224 B2 | 3/2018 | Rosengren et al. | |

(Continued)

FOREIGN PATENT DOCUMENTS

| | | |
|---|---|---|
| EP | 0132521 A1 | 5/1984 |
| EP | 0471155 A1 | 7/1994 |
| EP | 3238518 A1 | 11/2017 |
| EP | 3238519 A1 | 11/2017 |

(Continued)

OTHER PUBLICATIONS

Conterra, "Seeder", Feb. 2009.
Anertec & Gandy Company, "Operator's Manual 09PDMS (100 lb.) & P45PDMS (45 lb.) Poly Stainless Mp+3 (Positive Displacement Metering System)", Mar. 2014.

(Continued)

*Primary Examiner* — Christopher J. Novosad
(74) *Attorney, Agent, or Firm* — Rebecca L. Henkel; Rickard K. DeMille

(57) ABSTRACT

A modular meter roller for an agricultural metering system. The modular meter roller includes a shaft that rotates. A first roller segment that defines a first aperture that receives the shaft. The first roller segment receives and meters flowable particulate material in a groove via rotation of the shaft. A first end plate couples to the shaft. The first end plate blocks removal of the first roller segment in a first axial direction. A second end plate removably couples to the shaft. The second end plate enables an exchange of the first roller segment with a second roller segment and blocks removal of the first roller segment in a second axial direction during operation of the modular meter roller.

10 Claims, 19 Drawing Sheets

(56) References Cited

U.S. PATENT DOCUMENTS

| | | |
|---|---|---|
| 9,924,627 B1 | 3/2018 | Beaujot et al. |
| 9,936,629 B2 | 4/2018 | Thompson et al. |
| 9,939,302 B2 | 4/2018 | Gervais et al. |
| 9,949,427 B2 | 4/2018 | Schweitzer et al. |
| 9,980,599 B2 | 5/2018 | Van Os et al. |
| 10,039,225 B2 | 8/2018 | McCrea et al. |
| 10,076,073 B2 | 9/2018 | Kowalchuk et al. |
| 10,080,324 B2 | 9/2018 | Sheppard et al. |
| 10,085,376 B1 | 10/2018 | Cloutier Boily et al. |
| 10,104,830 B2 | 10/2018 | Heathcote |
| 2016/0120109 A1 | 5/2016 | Henry |
| 2017/0273235 A1 | 9/2017 | Kordick |
| 2018/0255699 A1 | 9/2018 | Cloutier Boily et al. |
| 2018/0263176 A1 | 9/2018 | Cloutier Boily |
| 2018/0263178 A1 | 9/2018 | Cloutier Boily |
| 2018/0310470 A1 | 11/2018 | Gilstring |

FOREIGN PATENT DOCUMENTS

| | | |
|---|---|---|
| WO | 2003079760 A1 | 10/2003 |
| WO | 2008150241 A1 | 12/2008 |
| WO | 2017061942 A1 | 4/2017 |
| WO | 2017138867 A1 | 8/2017 |

OTHER PUBLICATIONS

Newholland Agriculture, Nov. 12, 2018.
Vaderstad, "Fenix III seed meter", Nov. 16, 2018.
Machinery, "Lots on display in demo area of Tillage-Live", Sep. 23, 2011.
Precision Air 4765, Nov. 14, 2018.
Next generation ts-drill breaks cover, Jun. 10, 2016.
Peter Hill, "Good Drill Hunting", Sep. 11, 2015.

* cited by examiner

US 10,750,665 B1

METER ROLLER SYSTEM

BACKGROUND

The disclosure relates generally to a meter roller for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

BRIEF DESCRIPTION

In one embodiment, a modular meter roller for an agricultural metering system. The modular meter roller includes a shaft that rotates. A first roller segment that defines a first aperture that receives the shaft. The first roller segment receives and meters flowable particulate material in a groove via rotation of the shaft. A first end plate couples to the shaft. The first end plate blocks removal of the first roller segment in a first axial direction. A second end plate removably couples to the shaft. The second end plate enables an exchange of the first roller segment with a second roller segment and blocks removal of the first roller segment in a second axial direction during operation of the modular meter roller.

In another embodiment, a modular meter roller kit for an agricultural metering system. The modular meter roller kit includes a shaft that rotates. A first roller segment defines a first aperture that receives the shaft. The first roller segment receives and meters flowable particulate material in a first groove via rotation of the shaft. A second roller segment defines a second aperture that receives the shaft. The second roller segment receives and meters flowable particulate material in a second groove via rotation of the shaft. A first shape of the first groove and a second shape of the second groove are different. A first end plate couples to the shaft. The first end plate blocks removal of the first roller segment and the second roller segment in a first axial direction. A second end plate removably couples to the shaft. The second end plate enables an exchange of the first roller segment with the second roller segment and blocks removal of the first roller segment and the second roller segment in a second axial direction during operation of the modular meter roller.

In another embodiment, a modular meter roller for an agricultural metering system. The modular meter roller includes a shaft that rotates. A first roller segment that defines a first aperture that receives the shaft. The first roller segment receives and meters flowable particulate material in a first groove via rotation of the shaft. A second roller segment defines a second aperture that receives the shaft. The second roller segment receives and meters flowable particulate material in a second groove via rotation of the shaft. A separation plate couples to the shaft between the first roller segment and the second roller segment along a longitudinal axis of the shaft. A first end plate couples to the shaft. The first end plate blocks removal of the first roller segment and the second roller segment in a first axial direction. A second end plate removably couples to the shaft. The second end plate enables an exchange of the first roller segment and/or the second roller segment with a third roller segment and/or a fourth roller segment and blocks removal of the first roller segment, the second roller segment, the third roller segment, and/or the fourth roller segment in a second axial direction during operation of the modular meter roller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
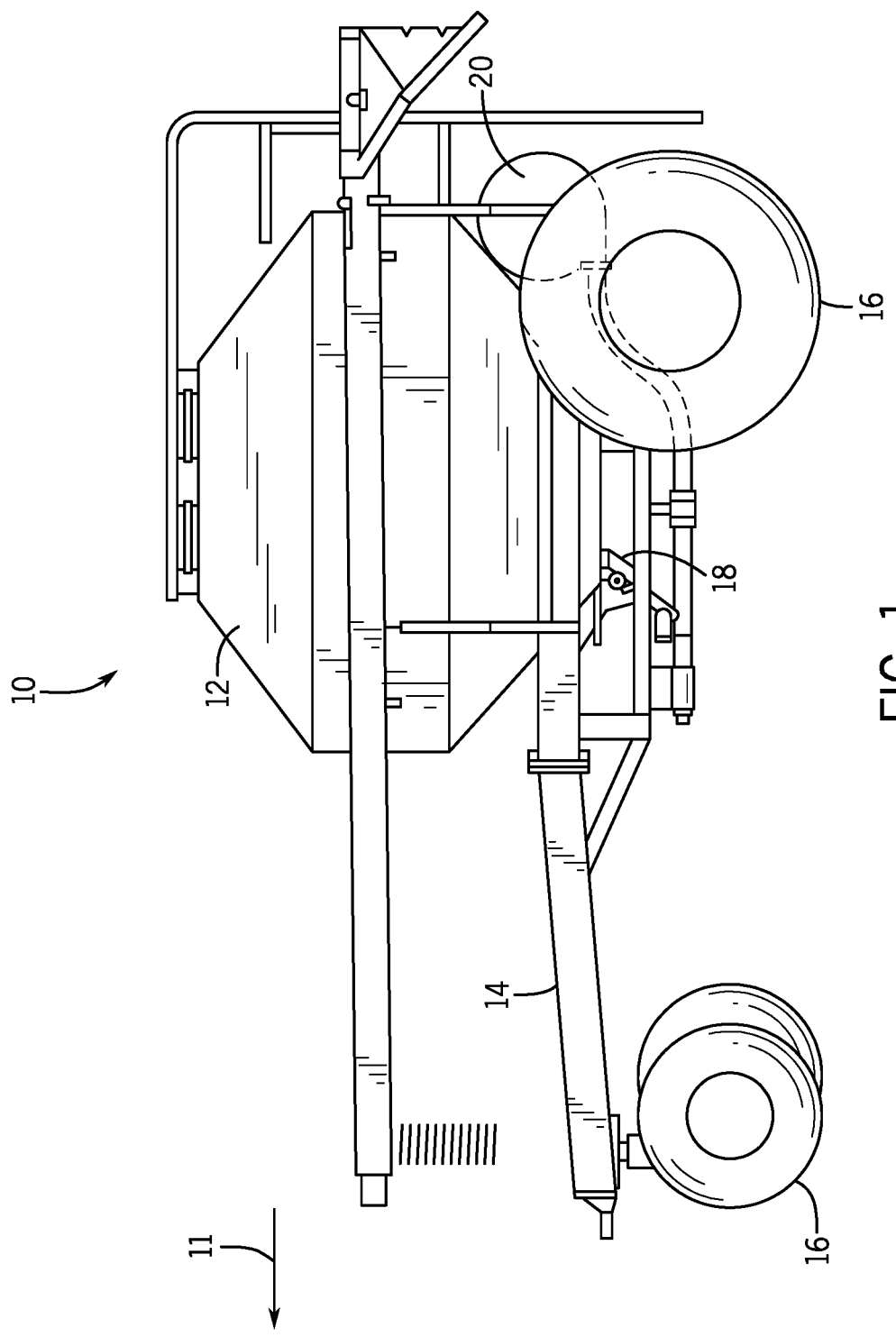
FIG. 1 is a side view of an air cart, including a metering system configured to regulate a flow of particulate material, according to an embodiment of the disclosure.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11 (e.g., behind the implement or in front of the implement). In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
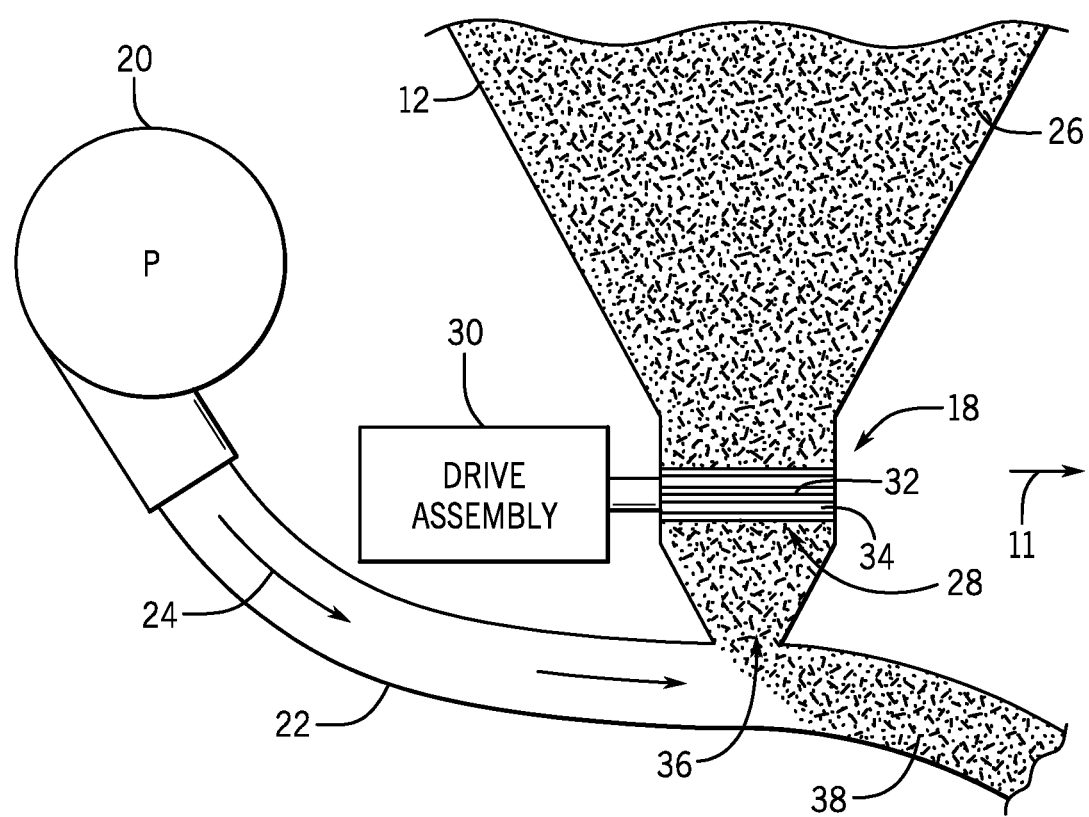
FIG. 2 is a schematic view of a metering system that may be employed within the air cart of FIG. 1, according to an embodiment of the disclosure.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more modular meter rollers 28 configured to regulate the flow of material 26 into the air flow 24. In certain embodiments, the metering system 18 may include multiple modular meter rollers 28 (e.g., housed within individual meter boxes) disposed adjacent to one another. In addition, certain metering systems 18 may include twelve modular meter rollers 28, each housed within an individual meter box and each configured to flow particulate material into a respective conduit 22 (e.g., of a material distribution system) for distribution to one or more respective row units of the agricultural implement. However, in alternative embodiments, the metering system 18 may include more or fewer meter rollers, e.g., 1, 2, 3, 4, 5, 6, 7, 8, 9, 10, 11, 13, or more. By independently adjusting the rotation speed of each meter roller, product flow to different portions of the implement may be particularly controlled.

In the illustrated embodiment, the modular meter roller 28 is coupled to a drive assembly 30 configured to drive the modular meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the modular meter roller 28 to rotate. Such a configuration automatically varies the rotation rate of the modular meter roller 28 based on the speed of the air cart.

The modular meter roller 28 also includes protrusions, such as the illustrated fins 32, and recesses 34. Each respective recess 34 is disposed between a respective pair of fins 32. As the modular meter roller 28 rotates, the respective pair of fins 32 moves the material 26 (e.g., agricultural product) disposed within the respective recess 34 downwardly, thereby transferring the material 26 to the conduit 22. The number and geometry of the fins 32 are particularly configured to accommodate the material 26 being distributed. Certain modular meter rollers 28 may include six fins 32 and a corresponding number of recesses 34. Alternative meter rollers may include more or fewer fins 32 and/or recesses 34. For example, the modular meter roller 28 may include 1, 2, 3, 4, 5, 6, 7, 8, 9, 10, 11, 12, 13, 14, 15, 16, 17, 18, 19, 20, or more fins 32 and/or recesses 34. In addition, the depth of the recesses 34 and/or the height of the fins 32 are configured to accommodate the material 26 within the storage tank 12. For example, a meter roller having deeper recesses 34 and fewer fins 32 may be employed for larger seeds, while a meter roller having shallower recesses 34 and more fins 32 may be employed for smaller seeds. Other parameters such as fin pitch (i.e., angle of the fin relative to a longitudinal/rotational axis) and fin angle (i.e., angle of the fin relative to a radial axis) may also be particularly selected to accommodate the material 26. While the illustrated meter roller includes fins, it should be appreciated that in alternative embodiments, the meter roller may include other protrusions, and/or the recesses may be omitted.

In the illustrated embodiment, the rotationally axis of the modular meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the modular meter roller 28 controls the flow of material 26 into the air flow 24. For example, as the modular meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduit(s), where the seeds and/or fertilizer are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

Figure 3:
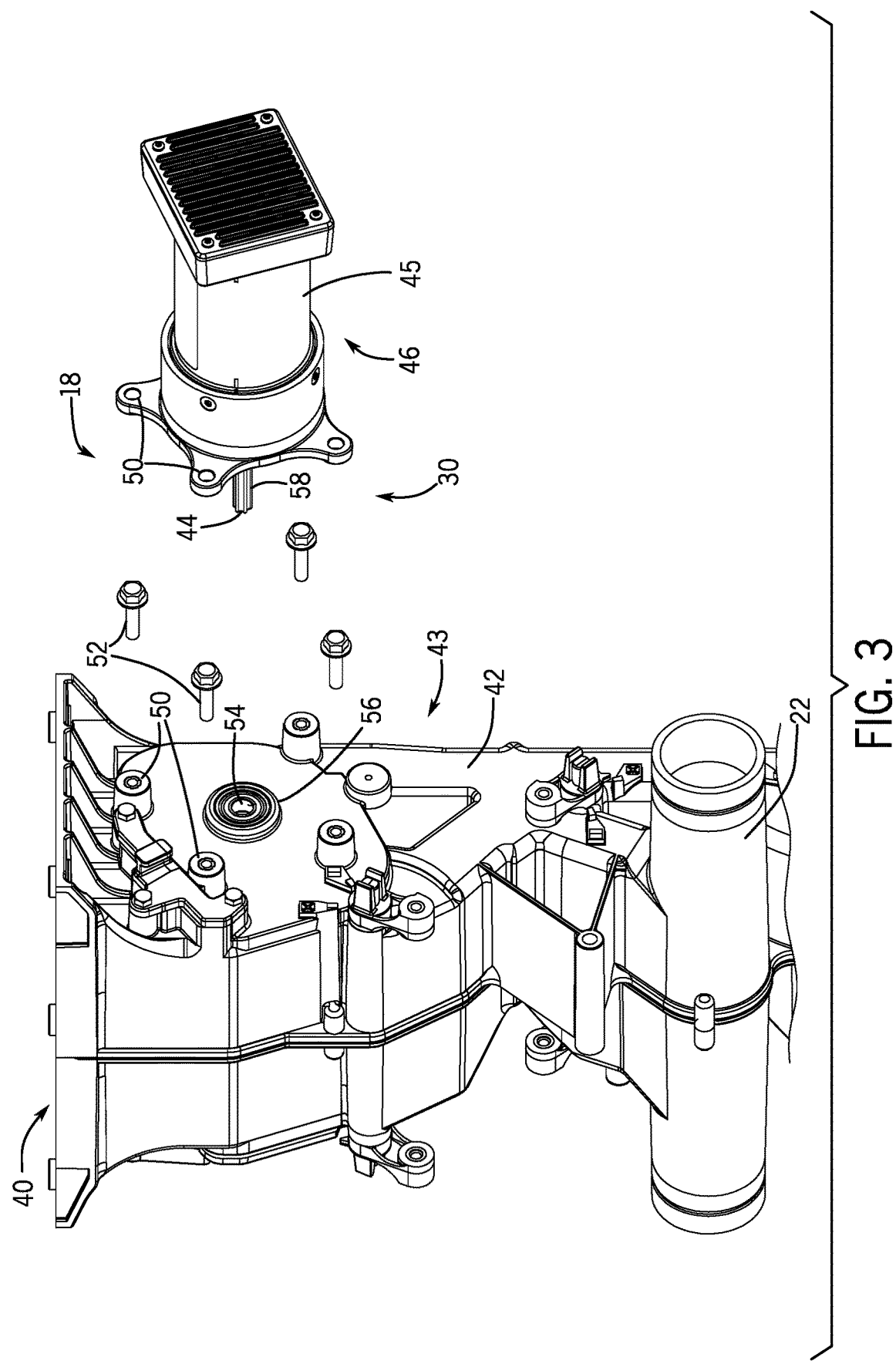
FIG. 3 is an exploded perspective view of a metering system that may be employed within the air cart of FIG. 1, according to an embodiment of the disclosure.

FIG. 3 is an exploded perspective view of an embodiment of a metering system 18 that may be employed within the air cart of FIG. 1. The metering system 18 includes a meter box 40 and a drive assembly 30. The meter box 40 has a passage 42 configured to direct the flowable particulate material to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor (e.g., electric motor) 45 that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the meter box 40. The drive shaft 44 is configured to drive the meter roller to rotate. A bearing (e.g., ball bearing) 56 facilitates rotation of the drive shaft 44 and meter roller within the meter box 40. As the conduit 22 transfers air under the passage 42, the motor (e.g., electric motor) of the drive unit 46 drives the drive shaft 44 to rotate the meter roller. As the meter roller rotates, the meter roller dispenses flowable particulate material via the passage 42 to the air flow within the conduit 22 to form the air/material mixture. Further, pressurized air from the tank may flow through the passage 42 with the material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, it should be appreciated that in alternative embodiments, the drive unit may include any other suitable system configured to drive rotation of the meter roller, such as a hydraulic motor, a pneumatic motor, or a gear assembly coupled to a wheel of the air cart.

Figure 4:
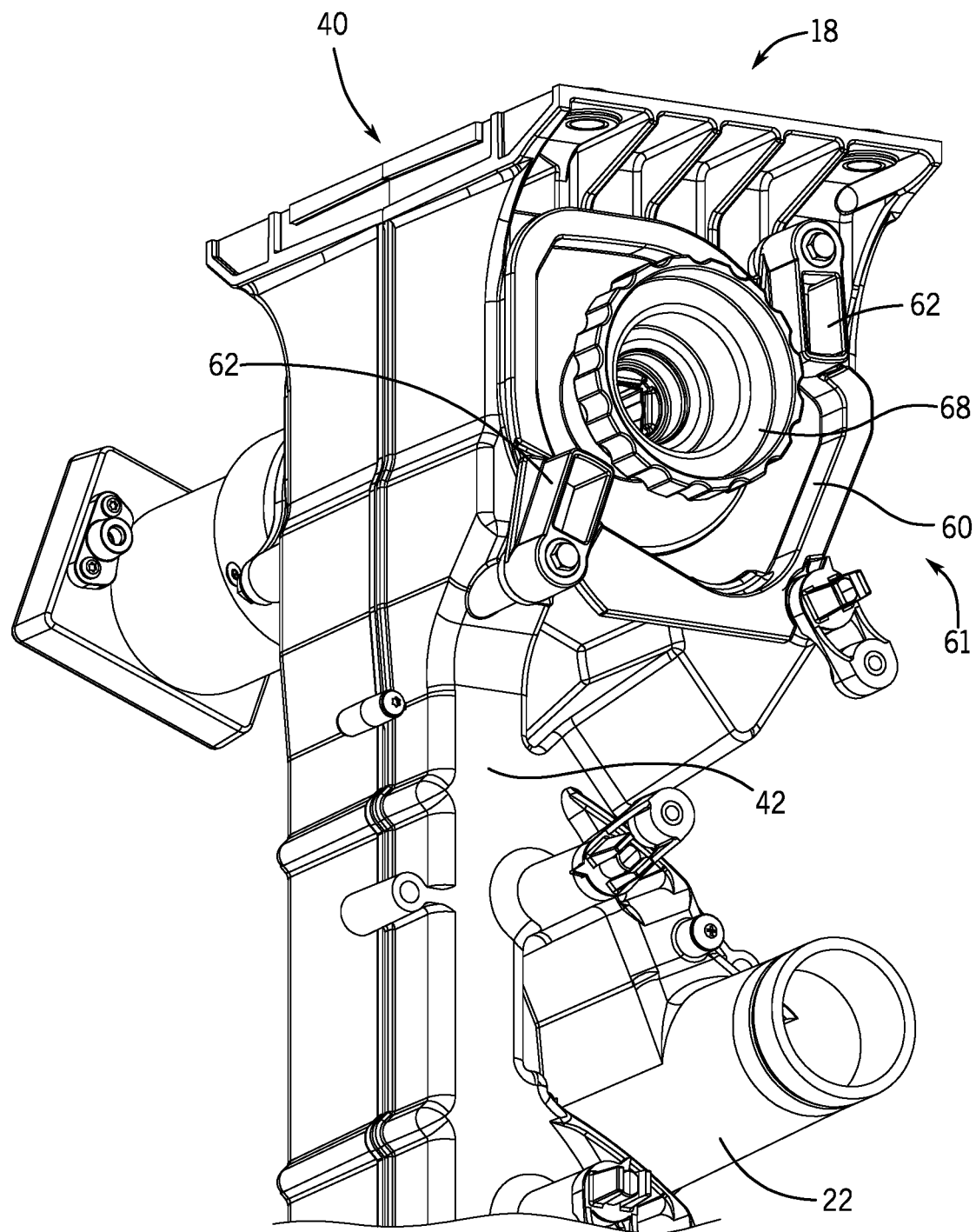
FIG. 4 is a perspective view of the metering system of FIG. 3, in which a cartridge is disposed within a meter box, according to an embodiment of the disclosure.

FIG. 4 is a perspective view of the metering system 18 of FIG. 3, in which a cartridge 60 is disposed within the meter box 40. As discussed in detail below, the cartridge 60 (e.g., modular meter roller cartridge) is configured to facilitate removal and installation of the meter roller via a meter box opening on a second side 61 (e.g., cartridge side) of the meter box 40. As illustrated, the meter box 40 houses the cartridge 60 while the cartridge is disposed within the opening. While the cartridge 60 is housed within the meter box 40 of the metering system 18 in the illustrated embodiment, it should be appreciated that in alternative embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. The cartridge 60 has a cross-sectional shape that substantially corresponds to the cross-sectional shape of the meter box opening. As illustrated, the meter box 40 includes two cartridge locking tabs 62 configured to selectively block removal of the cartridge 60 from the meter box 40, thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart). The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, it should be appreciated that in alternative embodiments, the cartridge locking tab may be part of a spring latch, a bolt latch, or any suitable type of locking mechanism. Furthermore, while the illustrated meter box includes two locking tabs, it should be appreciated that in alternative embodiments, the meter box may include more or fewer locking tabs (e.g., 1, 2, 3, 4, etc.). In the illustrated embodiment, the cartridge 60 includes a releasable bearing coupler 68. As discussed in detail below, the releasable bearing coupler 68 retains the meter roller within the cartridge, facilitates rotation of the meter roller within the cartridge, and facilitates removal of the meter roller from the cartridge.

Figure 5:
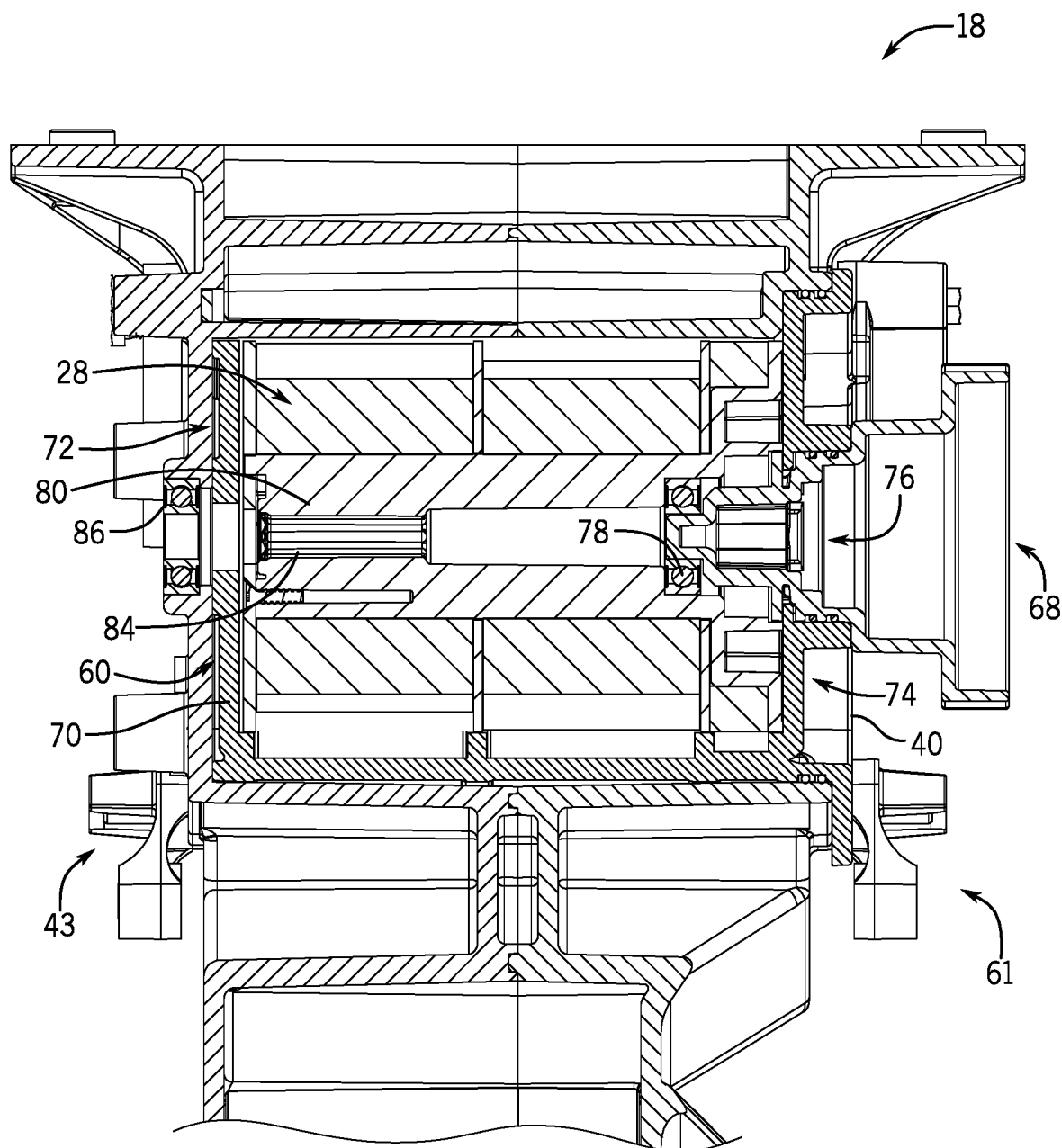
FIG. 5 is a cross-sectional view of the metering system of FIG. 3, according to an embodiment of the disclosure.

FIG. 5 is a cross-sectional view of the metering system 18 of FIG. 3. As illustrated, the cartridge 60 is engaged with/disposed within the meter box 40 of the metering system 18. The cartridge 60 includes a housing 70 configured to rotatably support the modular meter roller 28 within the meter box 40 (e.g., the housing 70 is secured to the meter box while the modular meter roller 28 rotates). The housing 70 includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the modular meter roller 28. The modular meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. The driven shaft may be an integral part of a meter roller spindle, and the fins and recesses of the meter roller may be formed on one or more meter roller inserts non-rotatably coupled to the spindle. While the second engagement feature includes recesses in the illustrated embodiment, it should be appreciated that in alternative embodiments, the second engagement feature may include a cavity having a polygonal cross-section and configured to engage the drive shaft having a corresponding polygonal cross-section (e.g., first engagement feature). Furthermore, while the illustrated second engagement feature 84 facilities shape-based engagement with the first engagement feature, it should be appreciated that in alternative embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft 80, the drive shaft, and the meter roller bearing 78 associated with the releasable bearing coupler 68 are in longitudinal alignment, thereby facilitating rotation of the modular meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box 40, the housing 70 rotatably supports/houses the modular meter roller 28. To change a modular meter roller 28, the operator may remove the cartridge 60, replace the modular meter roller 28, and then reinstall the cartridge 60. Alternatively, the operator may remove the cartridge 60 and replace the cartridge with another cartridge that contains a different meter roller or with a different cartridge type.

Figure 6:
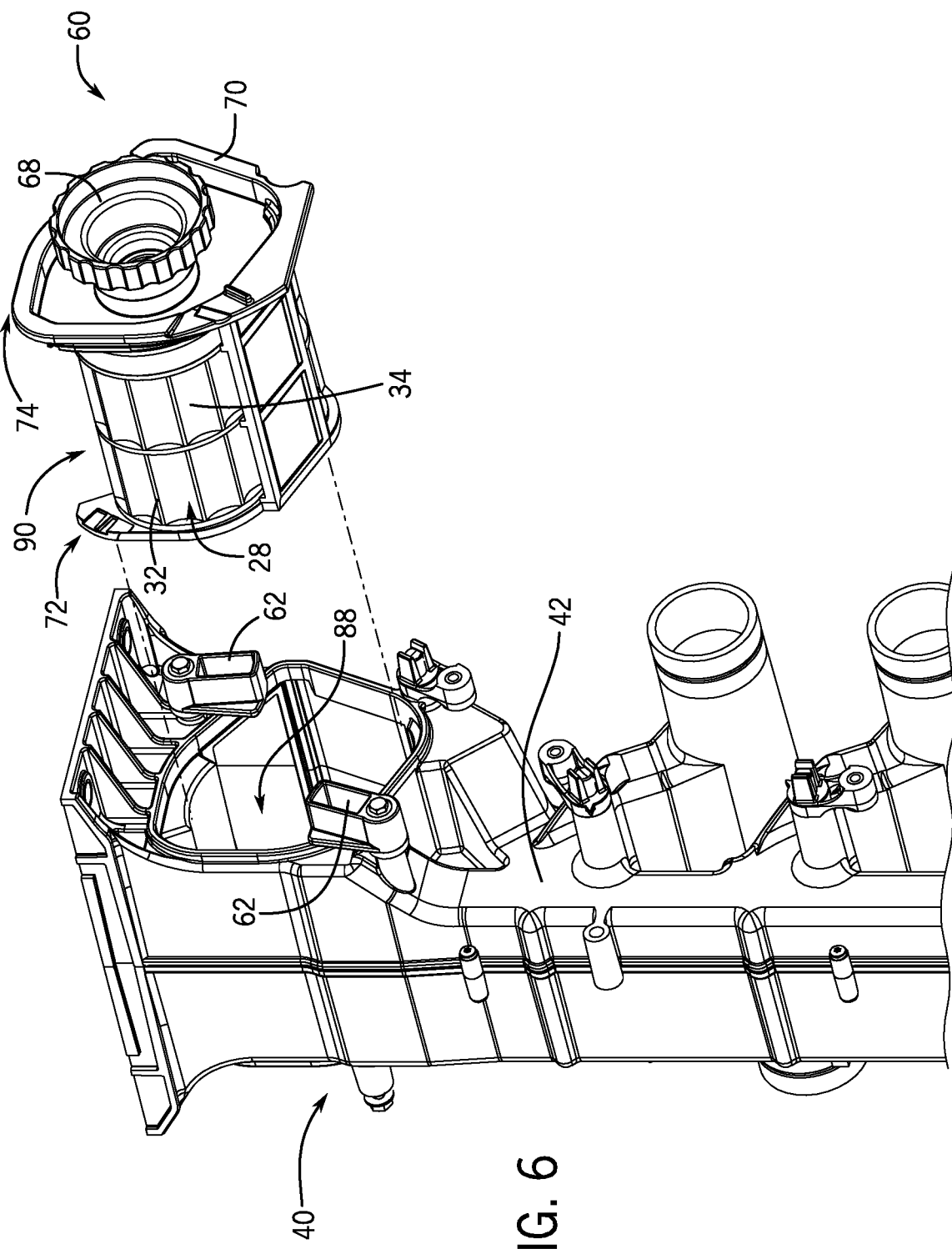
FIG. 6 is a perspective view of the metering system of FIG. 3, in which the cartridge is removed from the meter box, according to an embodiment of the disclosure.

FIG. 6 is a perspective view of the metering system of FIG. 3, in which the cartridge 60 is removed from the meter box 40. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially correspond to the cross-sectional shape of the meter box opening 88.

As illustrated, the modular meter roller 28 includes fins 32 and recesses 34, which are configured to enable the modular meter roller 28 to control the flow of the flowable particulate material into the passage 42. The modular meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/housing. Once the rotatable bearing coupler 68 is removed, the modular meter roller 28 may be removed through an opening 90, thereby enabling insertion of another meter roller (e.g., suitable for use with material having a larger or small particle size, and/or for a higher or lower target application rate).

Figure 7:
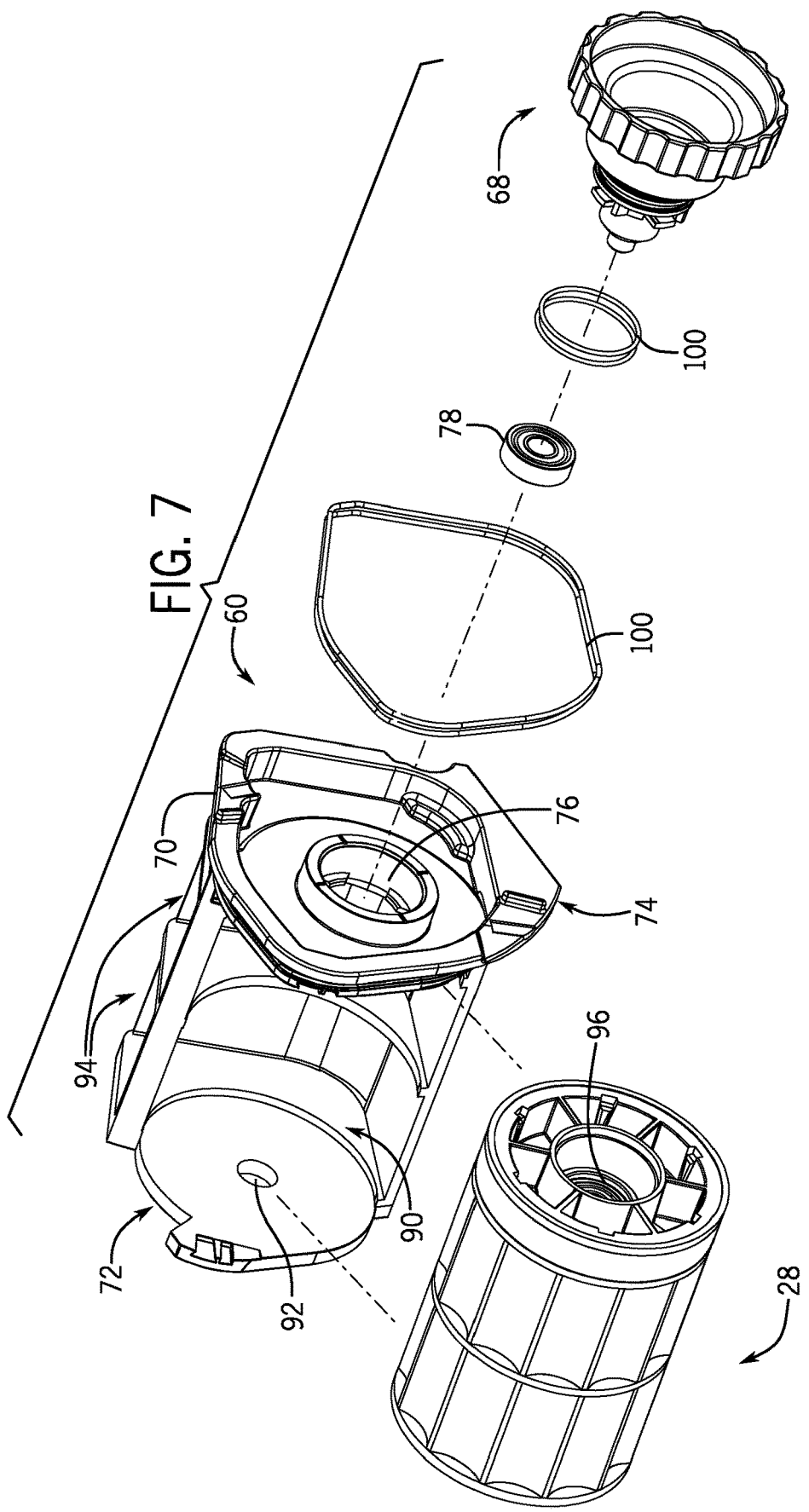
FIG. 7 is an exploded perspective view of the cartridge of FIG. 4, in which a modular meter roller is removed from a housing of the cartridge, according to an embodiment of the disclosure.

FIG. 7 is an exploded perspective view of the cartridge 60 of FIG. 4, in which the modular meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the modular meter roller 28 to receive the material.

To couple the modular meter roller 28 to the housing 70, the modular meter roller 28 is disposed within the housing 70 through the meter roller opening 90. While the modular meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the modular meter roller 28. The bearing opening 96 may be configured to receive the bearing 78 or the bearing may be fixedly mounted within the opening 96. The openings of the modular meter roller 28 and cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, it should be appreciated that in alternative embodiments, any suitable number of gaskets (e.g., O-rings) may be used to seal adjacent parts. Once the modular meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the modular meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the modular meter roller 28 to facilitate rotation of the modular meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the modular meter roller 28 and secures the meter roller to the housing 70.

Figure 8:
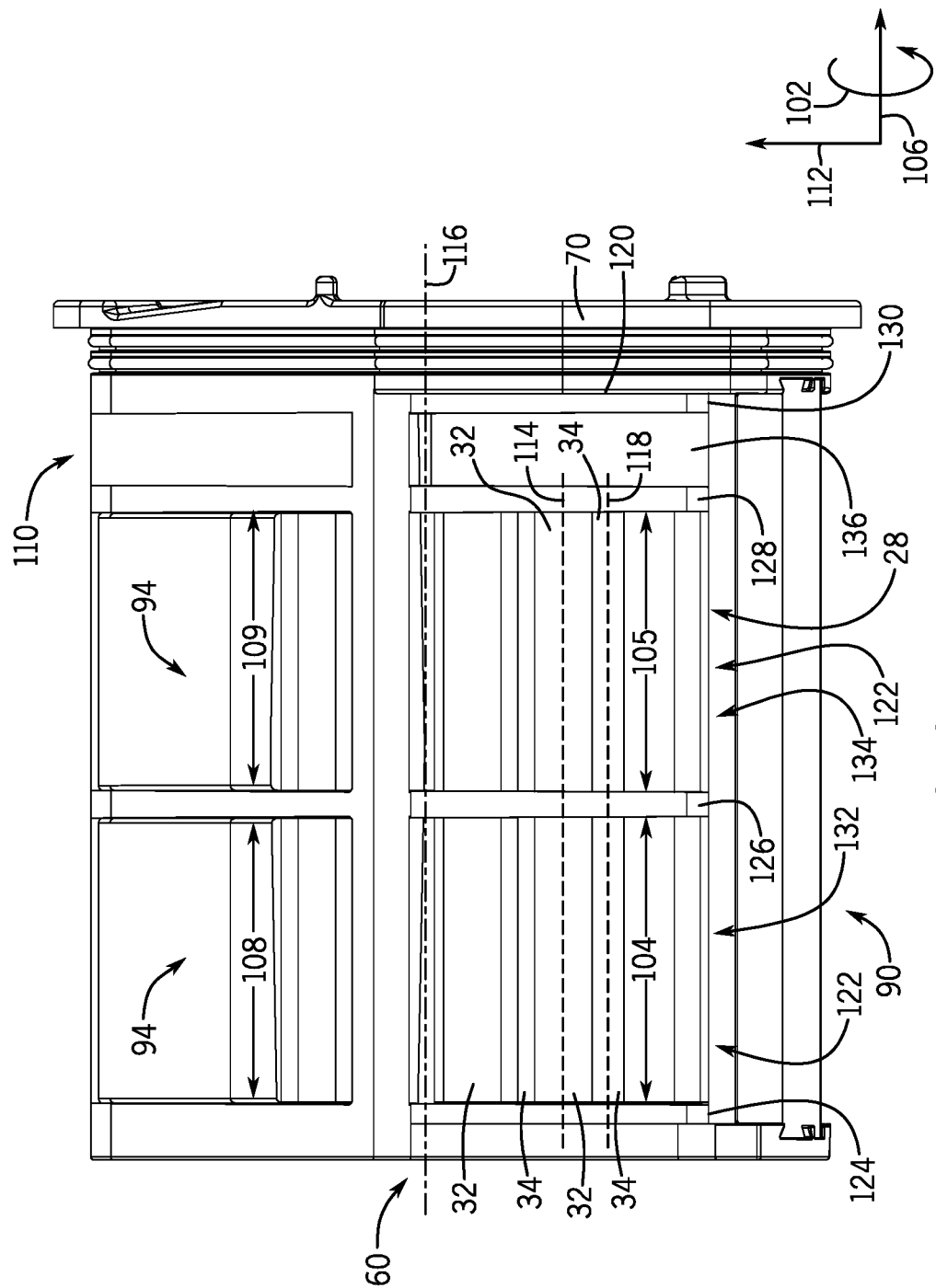
FIG. 8 is a top view of the cartridge of FIG. 4, according to an embodiment of the disclosure.

FIG. 8 is a top view of the cartridge 60 of FIG. 4. In the illustrated embodiment, the modular meter roller 28 within the cartridge 60 is configured to meter flowable particulate material having fine particles at a low rate. Accordingly, the aggregate volume of the recesses may be less than a meter roller configured to meter larger particles at a faster rate. In the illustrated embodiment, the circumferential extent of each fin 32 (e.g., extent of each fin 32 along a circumferential axis 102) is at least 1.5 times greater than the circumferential extent of each recess 34 (e.g., extent of each recess 34 along the circumferential axis 102) along an entire longitudinal extent 104 or 105 of the fin 32 and the recess 34 (e.g., the entire extent 104 of the fin 32 and the recess 34 of a first rank 132 along a longitudinal axis 106, and an entire extent 105 of the fins 32 and the recesses 34 of a second rank 134 along the longitudinal axis 106). Furthermore, the entire longitudinal extent 104 or 105 of each fin 32 and each recess 34 is greater than the circumferential extent of the fin and the circumferential extent of the recess.

In the illustrated embodiment, the longitudinal extent 104 of the fins 32 and recesses 34 of the first rank 132 is substantially equal to a width 108 of a respective material receiving opening 94 (e.g., extent of the material receiving opening 94 along the longitudinal axis 106). In addition, the longitudinal extent 105 of the fins 32 and recesses 34 of the second rank 134 is substantially equal to a width 109 of a respective material receiving opening 94 (e.g., extent of the material receiving opening 94 along the longitudinal axis 106). For example, the fin/recess longitudinal extent 104, 105 and the opening width 108, 109 may be between about 20 and about 75 mm, about 30 and about 50 mm, about 47.5 mm, or about 32.5 mm. As previously discussed, the flowable particulate material flows through the material receiving openings 94 to the modular meter roller 28. The width 108, 109 of the material receiving openings substantially reduces or eliminates the possibility of the openings becoming blocked due to clumping of the flowable agricultural product (e.g., as compared to a narrower opening, such as the auxiliary opening 110, which is currently blocked). However, the wider openings enable more flowable particulate material to flow to the meter roller. Accordingly, the illustrated modular meter roller 28 includes recesses 34 that have a small aggregate volume to establish a low flow rate for a particular meter roller rotation speed. For example, as previously discussed, the recesses are circumferentially spaced apart from one another by more than 1.5 times the circumferential extent of the recesses. In addition, the depth of each recess (e.g., extent of the recess along a radial axis 112) is shallow to reduce the aggregate volume of the recesses. As a result of the meter roller configuration, the meter roller may provide flowable particulate material to the distribution system at a low flow rate while substantially reducing or eliminating the possibility of blocking the material receiving openings with clumped material.

Meter rollers may be characterized by a ratio of aggregate recess volume to width of the material receiving opening. In the illustrated embodiment, each recess 34 of the first rank 132 has a volume of about 183 mm$^3$, and each rank (e.g., the first rank 132 and the second rank 134) has nine recesses. Accordingly, the aggregate recess volume for the first rank 132 is about 1643 mm$^3$. As previously discussed, the width 108 of the respective material receiving opening 94 (e.g., the opening 94 configured to provide flowable particulate material to the first rank 132) is about 47.5 mm. Accordingly, the ratio of aggregate recess volume to opening width for the first rank 132 is about 34. However, it should be appreciated that in certain embodiments, the ratio may be higher or lower (e.g., depending on the number of recesses and the volume of each recess). For example, to establish a low flow rate of fine particulate material while substantially reducing or eliminating the possibility of blocking the material receiving openings, the ratio may be less than about 50, less than about 45, less than about 40, less than about 35, or less than about 30. Utilizing such a meter roller profile may enable the motor of the drive unit to rotate the meter roller at a speed sufficient to facilitate precise control of the meter roller rotation rate (e.g., as compared to rotating a meter roller having a larger aggregate recess volume slower than a minimum controllable speed of the motor).

In the illustrated embodiment, the longitudinal axis 114 of each fin 32 is substantially parallel to the rotational axis 116 of the modular meter roller 28. In addition, the longitudinal axis 118 of each recess 34 is substantially parallel to the rotational axis 116 of the modular meter roller 28. However, as discussed in detail below, in alternative embodiments, the longitudinal axis of each fin and the longitudinal axis of each recess may be oriented at an angle (e.g., of at least 2 degrees) relative to the rotational axis of the meter roller. Furthermore, in certain embodiments, the fins and recesses may follow a curved path from one longitudinal side of a rank to the other longitudinal side of the rank.

In the illustrated embodiment, the modular meter roller 28 is formed from a spindle 120 and profile inserts 122. As discussed in detail below, the profile inserts, which form the fins and recesses of the meter roller, are arranged in ranks, and the profile inserts of each rank are coupled to one another and non-rotatably coupled to the spindle. Accordingly, as the drive shaft drives the spindle 120, which includes the driven shaft, to rotate, the profile inserts 122 are driven to rotate, thereby inducing the fins and the recesses to meter the flowable particulate material to the distribution system. In the illustrated embodiment, the spindle 120 includes a first ring 124, a second ring 126, a third ring 128, and a fourth ring 130. Each ring is rigidly and non-rotatably coupled to (e.g., integrally formed with) the driven shaft. A first rank 132 of profile inserts 122 is longitudinally disposed between the first ring 124 and the second ring 126, and a second rank 134 of profile inserts 122 is longitudinal disposed between the second ring 126 and the third ring 128. In addition, a sealing ring 136 is longitudinally disposed between the third ring 128 and the fourth ring 130. As discussed in detail below, the sealing ring 136 is configured to block the flowable particulate material from entering an interior of the spindle 120.

Figure 9:
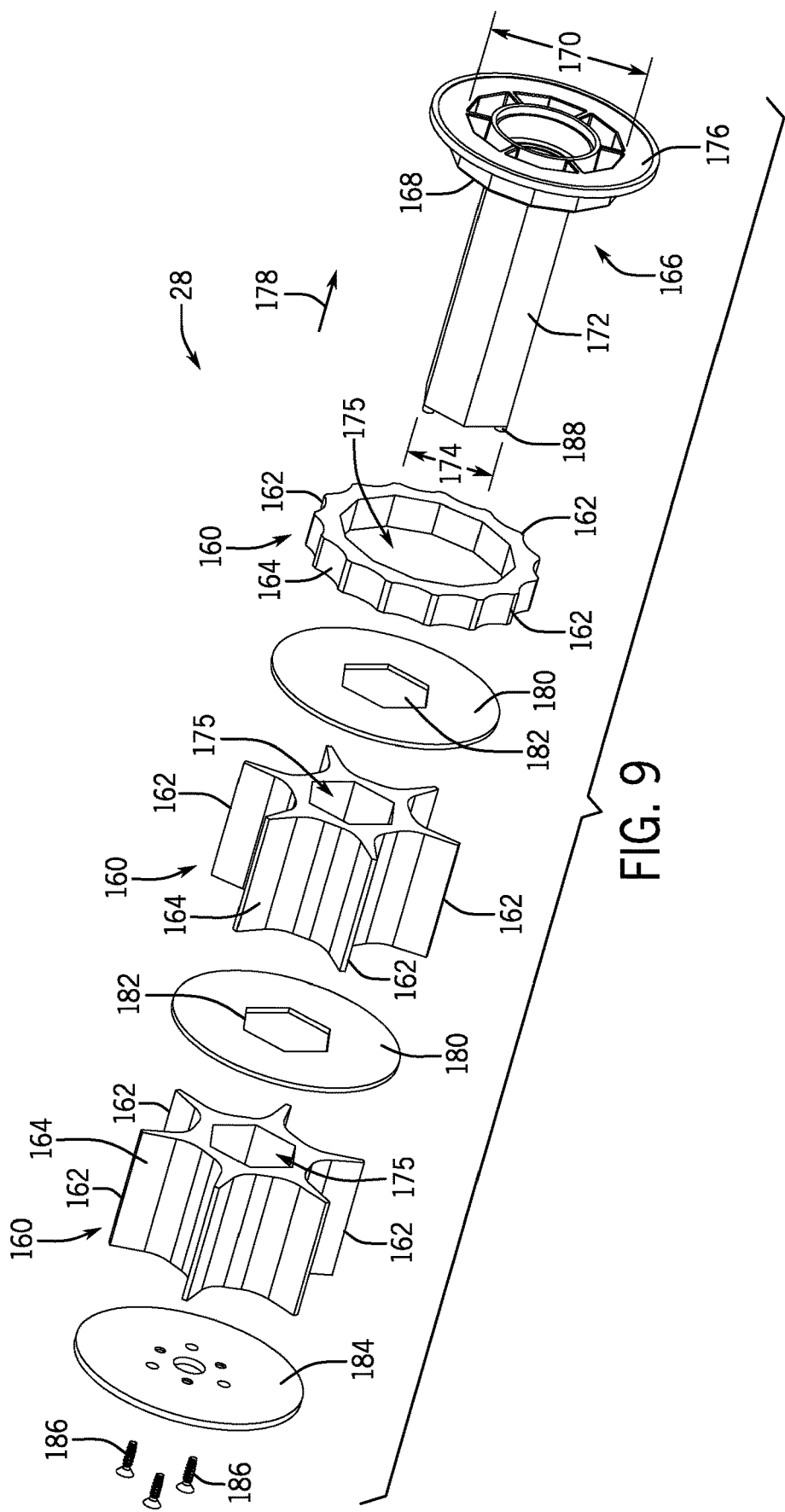
FIG. 9 is an exploded perspective view of a modular meter roller, according to an embodiment of the disclosure.

FIG. 9 is an exploded perspective view of a modular meter roller 28. The modular meter roller 28 enables a user to swap/replace roller segments 160 to accommodate metering of different types of product (e.g., seed, fertilizer). For example, some seeds may be large than others, such as corn versus canola. In order to meter differently sized seeds and/or other products at a desired rate, the modular meter roller 28 may change the roller segments 160. As will be explained below, the roller segments 160 may differ in the number of fins 162, size of grooves 164, depth of the grooves 164, as well as the profile of the fins 162 and/or the grooves 164 in order to accommodate different types of metered products.

The illustrated modular meter roller 28 includes three separate roller segments 160 that are configured to couple to the shaft 166. In other embodiments, the modular meter roller 28 may include a different number of roller segments 160 (e.g., one, two, three, four, five, six). Each of these roller segments 160 may differ from the other roller segments 160 in its number of fins 162, size of the grooves 164, profile, and/or a combination thereof. In this way, the modular meter roller 28 may enable metering of different products simultaneously through the metering system 18. The different roller segments 160 may also enable metering of different products at different times without removing and changing the modular meter roller 28. That is, some of the roller segments 160 on the modular meter roller 28 may meter a particular product while other roller segments 160 on the same modular meter roller 28 meter a different product. As will be explained below, in some embodiments the fins 162 and grooves 164 of the roller segments 160 may be offset (e.g., radially offset) from one another about the shaft 166. In operation, the offset between the roller segments 160 may reduce and/or block pulsing (e.g., vibration) of the modular meter roller 28 and thus vibration of the meter system 18.

In some embodiments, the shaft 166 may include multiple sections that accommodate different apertures of the roller segments 160. For example, the shaft 166 may include a first section 168 that defines a first diameter 170 and a second shaft section 172 that defines a second diameter 174. These shaft sections 168 and 172 may have a specific cross-sectional shape that enables the shaft 166 to couple to the roller segments 160 and to transfer force from the motor to the roller segments 160. For example, the first shaft section 168 may define a dodecahedron exterior surface profile, while the second shaft section 172 may define a hexagon exterior surface profile. These exterior surface profiles correspond to the profile of the apertures 175 in the roller segments 160 enabling the roller segments 160 to couple to and rotate with the shaft 166.

As illustrated, a first end plate 176 couples to the first section 168 of the shaft 166. The first end plate 176 is configured to block removal of the roller segments 160 in direction 178. The roller segments 160 are separated by discs 180 that couple to the shaft 166. The discs 180 may reduce and/or block metered product from moving between the roller segments 160. In order to block the flow of product between the roller segments 160, the discs 180 define a diameter 181 that is equal to or greater than the diameter of the roller segments 160. In some embodiments, the discs 180 may define apertures 182 that correspond to a profile of the shaft 166 (e.g., hexagon profile) enabling the shaft 166 to drive rotation of the discs 180 as well as the roller segments 160.

In order to block removal of the discs 180 and the roller segments 160 from the shaft 166, the modular meter roller 28 may include an end plate 184. The end plate 184 couples to the second shaft section 172 with one or more fasteners 186 (e.g., threaded fasteners) that couple to an end face 188 of the shaft 166.

Figure 10:
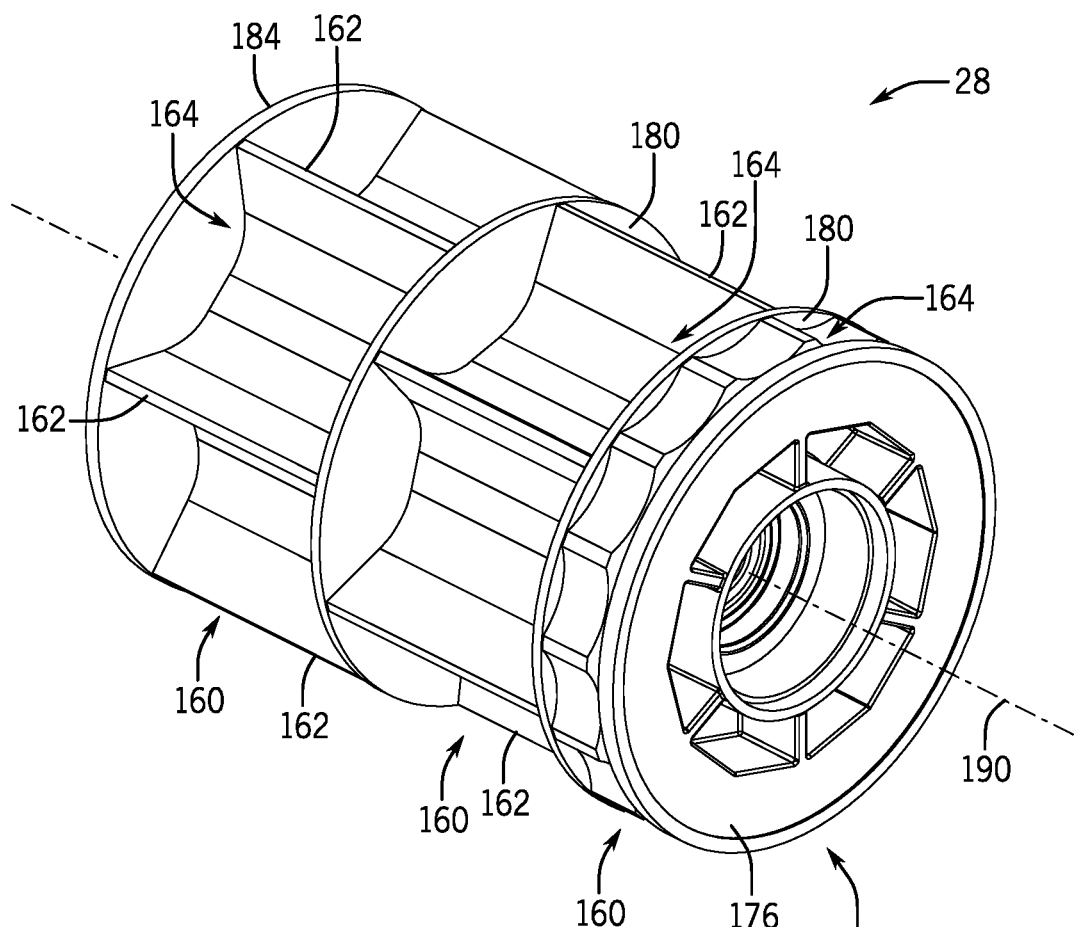
FIG. 10 is a perspective view of the assembled modular meter roller of FIG. 9, according to an embodiment of the disclosure.

FIG. 10 is a perspective view of the assembled modular meter roller 28 of FIG. 9. As illustrated, the roller segments 160 are separated from each other by the discs 180 enabling each roller segment 160 to meter product independently. Accordingly, each roller segment 160 may therefore facilitate metering of a particular product. In some embodiments, the roller segments 160 of the modular meter roller 28 may be offset from each other about the axis 190 of the shaft 166. That is, the fins 162 and grooves 164 of the roller segments 160 may be offset (e.g., radially offset) from one another about the shaft 166. By radially offsetting the roller segments 160, seed and/or particulate may fill and discharge from the grooves 164 at different times as the shaft 166 rotates. Accordingly, the vibration generated by filling and discharging particulate from the roller segments 160 may not occur simultaneously along the axis 190 of the shaft 166, which may reduce and/or block pulsing (e.g., vibration) of the modular meter roller 28 and thus vibration of the meter system 18.

Figure 11:
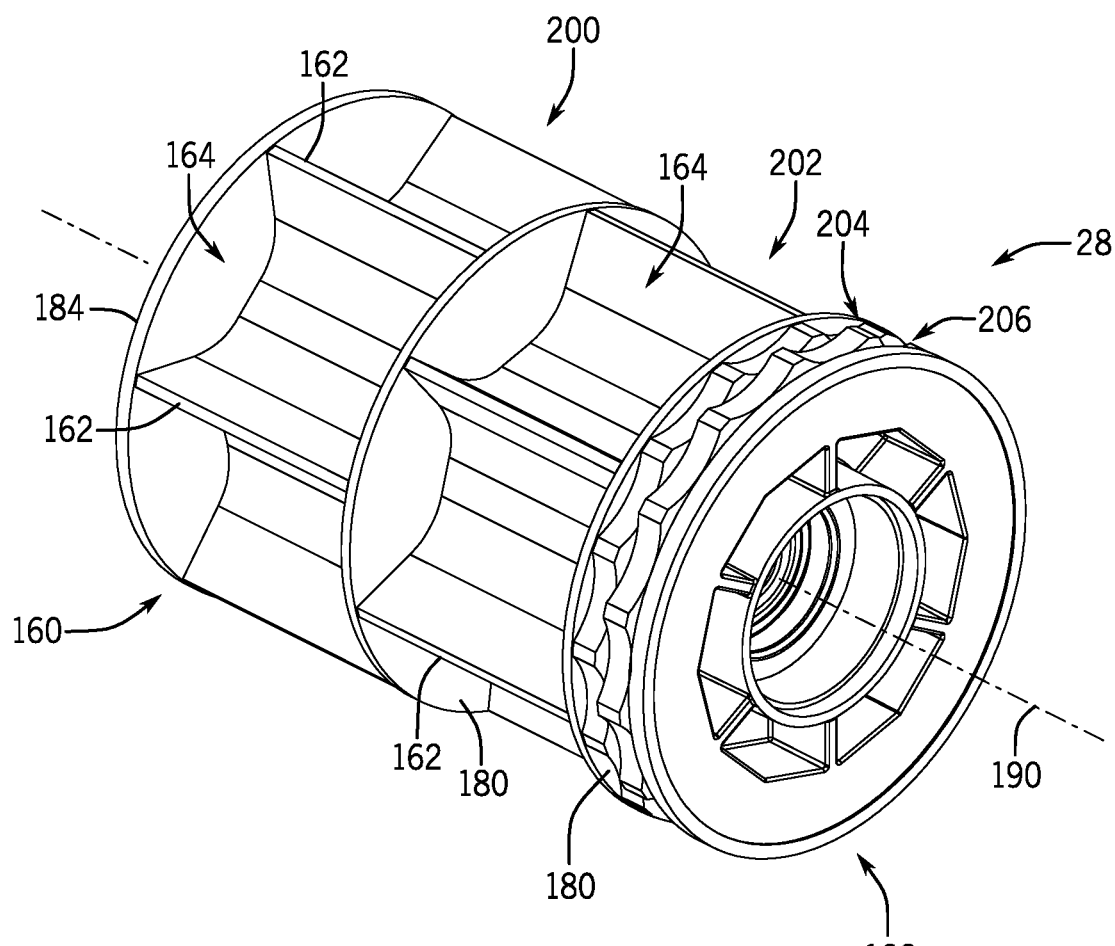
FIG. 11 is a perspective view of an assembled modular meter roller, according to an embodiment of the disclosure.

FIG. 11 is a perspective view of an assembled modular meter roller 28 with roller segments 160. The modular meter roller 28 includes four separate roller segments 200, 202, 204, and 206. As illustrated, separation discs 180 separate the roller segments 200 and 202, and the roller segment 202 from the roller segments 204 and 206. As explained above, the separation discs 180 block may reduce and/or block metered product from moving between the roller segments 160. However in some embodiments, the modular meter roller 28 may not include a disc 180 between some or all of the roller segments 160. As illustrated, the roller segments 204 and 206 are not separated by a disc 180. Instead, the roller segments 204 and 206 are radially offset from each other about the axis 190 of the modular meter roller 28. This offset may enable the roller segments 202 and 204 to reduce pulsing/vibration of the modular meter roller 28 while also reducing the transfer of product between the roller segments 204 and 206.

Figure 12:
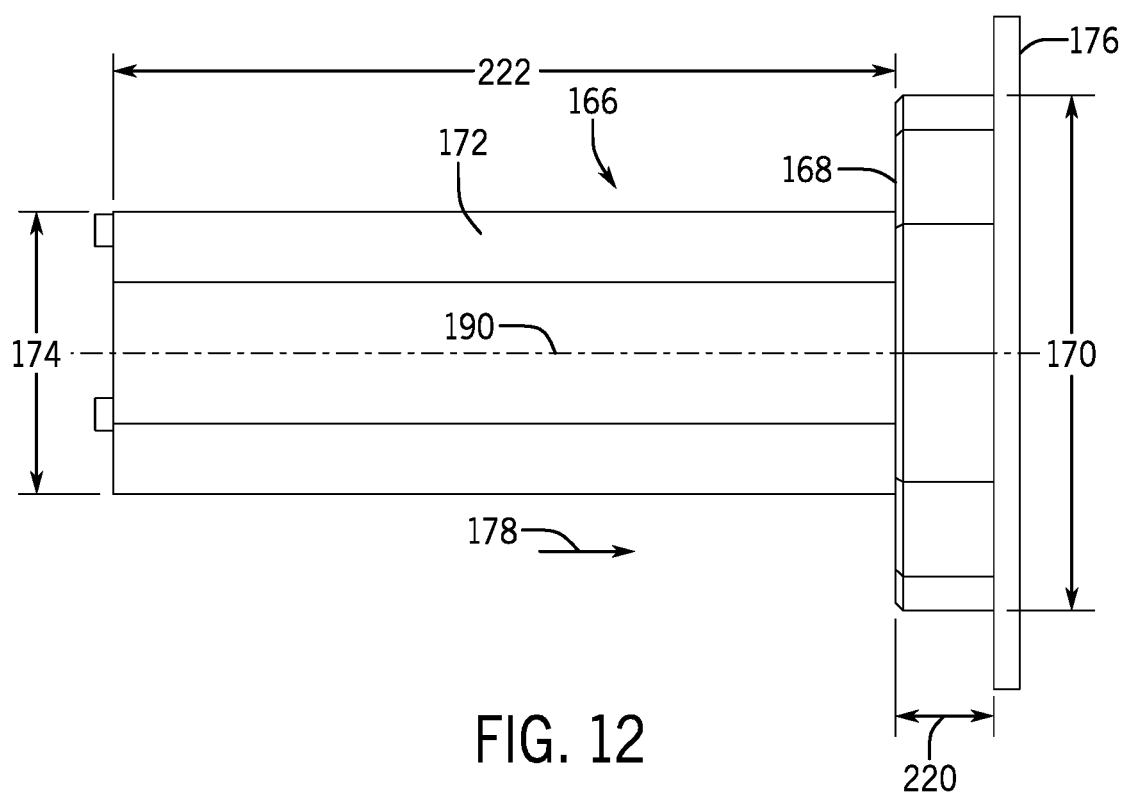
FIG. 12 is a side view of a shaft of the modular meter roller of FIG. 9, according to an embodiment of the disclosure.

FIG. 12 is a side view of a shaft 166 of the modular meter roller of FIG. 9. As explained above, the shaft 166 may include multiple sections. These sections may have different shapes and diameters. The shaft 166 includes a first section 168 that defines a first diameter 170 and a second shaft section 172 that defines a second diameter 174. These shaft sections 168 and 172 may have a specific cross-sectional shape that enables the shaft 166 to couple to the roller segments 160 and to transfer force from the motor to the roller segments 160. For example, the first shaft section 168 may define a dodecahedron exterior surface profile, while the second shaft section 172 may define a hexagon exterior surface profile. These exterior surface profiles correspond to apertures in the roller segments 160 enabling the roller segments 160 to couple to and rotate with the shaft 166. The length of these sections may also differ. For example, the first section 168 may define a length 220 while the second section 172 defines a second length 222. The lengths of these sections 168 and 172 may correspond to the lengths or cumulative lengths of the roller segments 160. While two section are illustrated, the shaft 166 may include multiple sections (e.g., 1, 2, 3, 4, 5, or more) with different diameters. Each of these sections may define the same or different exterior surface profiles (e.g., hexagon, octagon, nonagon, decagon) that matches the aperture in the roller segments 160. As illustrated, the end plate 176 couples to the first section 168 of the shaft 166. The first end plate 176 is configured to block removal of the roller segments 160 in direction 178. In some embodiments, the first shaft section 168, the second shaft section 172, and the end plate 176 may be one-piece (e.g., integral).

Figure 13:
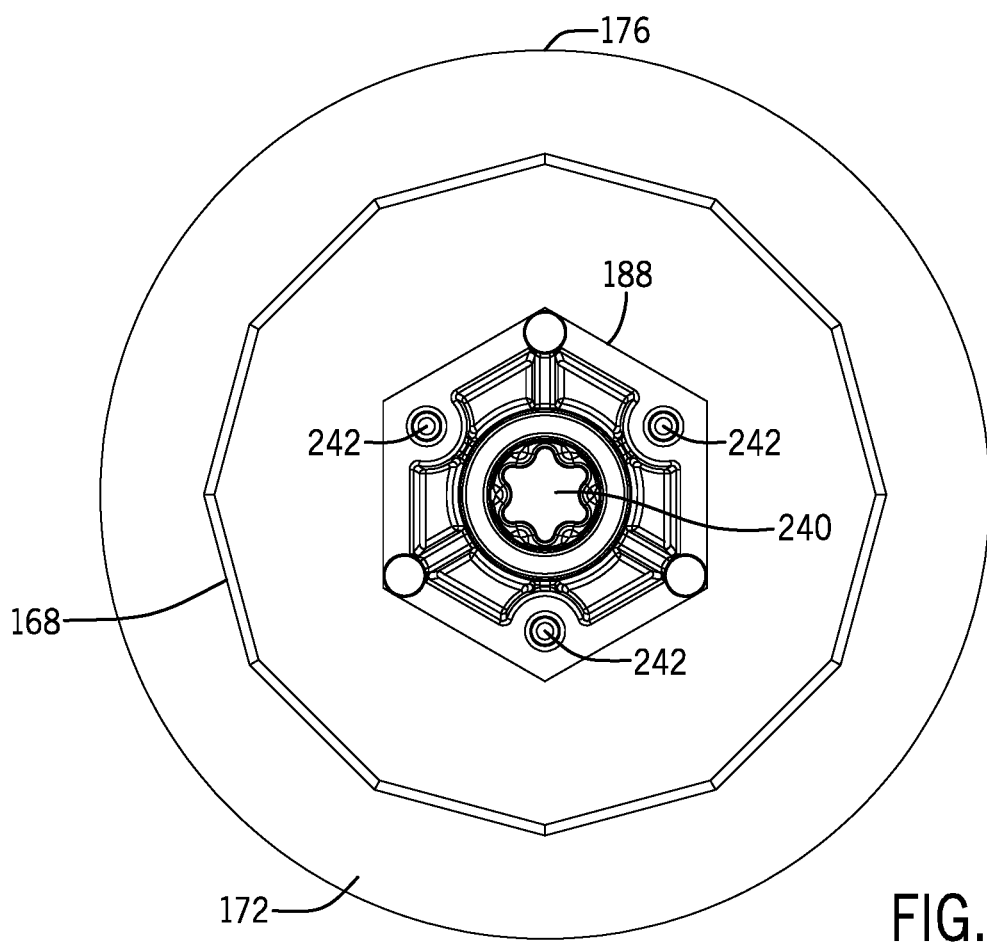
FIG. 13 is an end view of the shaft of the modular meter roller of FIG. 9, according to an embodiment of the disclosure.

FIG. 13 is an end view of the shaft 166 of the modular meter roller 28 of FIG. 9. As explained above, the shaft 166 includes the first shaft section 168, the second shaft section 172, and the end plate 176. As illustrated, the shaft 166 includes an aperture 240. The aperture 240 receives the drive shaft 44 enabling the motor 45 to drive rotation of the modular meter roller 28. As explained above, a second plate 184 couples to the end face 188 of the second shaft section 172. In order to couple the second plate 184 to the end face 188, the second shaft section 172 may define one or more apertures 242. The apertures 242 receive the fasteners 186 which couple the second plate 184 to the shaft 166. Once coupled to the shaft 166, the second plate 184 blocks removal of the roller segments 160 from the shaft 166. While three apertures 242 are illustrated in FIG. 13, other embodiments may include a different number of apertures 242 (e.g., 1, 2, 3, 4, 5, or more).

Figure 14:
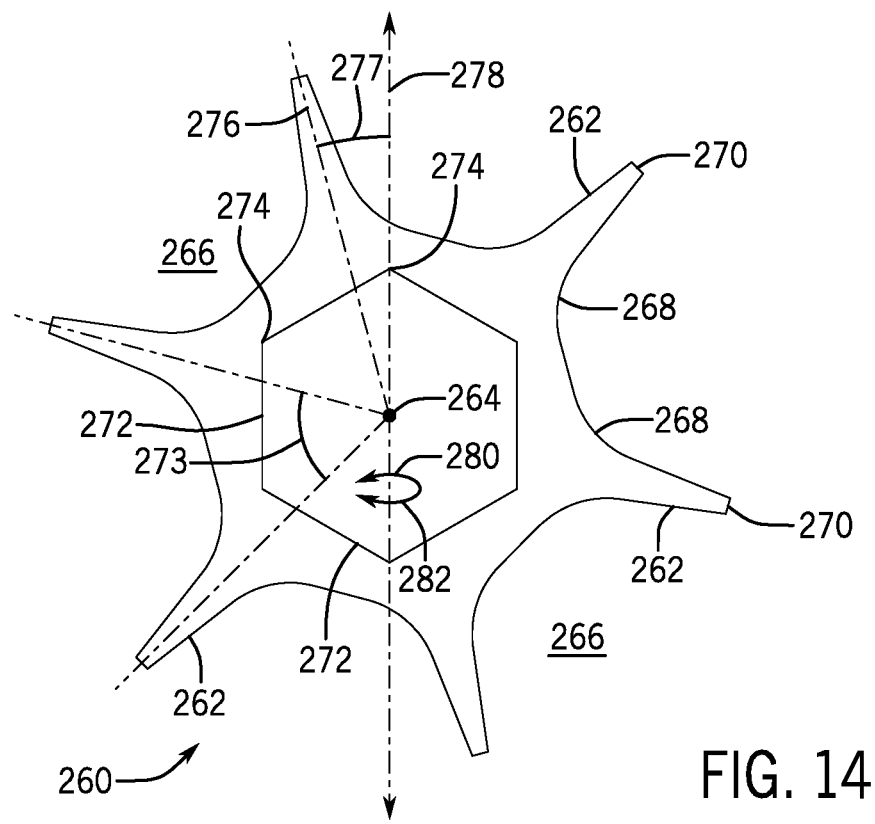
FIG. 14 is an end view of a roller segment, according to an embodiment of the disclosure.

FIGS. 14, 15, 16, 17, and 18 are cross-sectional views of roller segments that may be used in the modular meter roller 28 of FIG. 9. Each of these roller segments may differ from each other in their number of fins, size of grooves (e.g., fins), profile, and/or a combination thereof. In FIG. 14, the roller segment 260 includes six fins 262 equally spaced about an axis 264. Between each of the fins 262 is a groove 266. The grooves 266 receive the particulate as the roller segment 260 rotates about the axis 264 during operation of the modular meter roller 28. In some embodiments, the fins 262 define curved surfaces 268 between the tips 270 and the exterior surface or base 272 of the roller segment 260. The profile of the roller segment 260 between the fins 262 may therefore form a generally concave surface. In operation, as the roller segment 260 receives product, the curved surfaces 268 (e.g., concave profile) guide product into the grooves 266, which may reduce or limit the impact experienced by the product (e.g., seeds) as the product fills the grooves 266.

The roller segment 260 defines an aperture 272 that receives the shaft 166 enabling the roller segment 260 to couple to the modular meter roller 28. In FIG. 14, the aperture 272 is in the form of a hexagon. In other embodiments, the aperture 272 may have a different shape (e.g., octagon, decagon) that corresponds to the shape of the shaft 166. As explained above, the fins 262 are equally spaced from each other about the axis 264. The angle 273 between each of the fins 262 is therefore sixty degrees.

Figure 15:
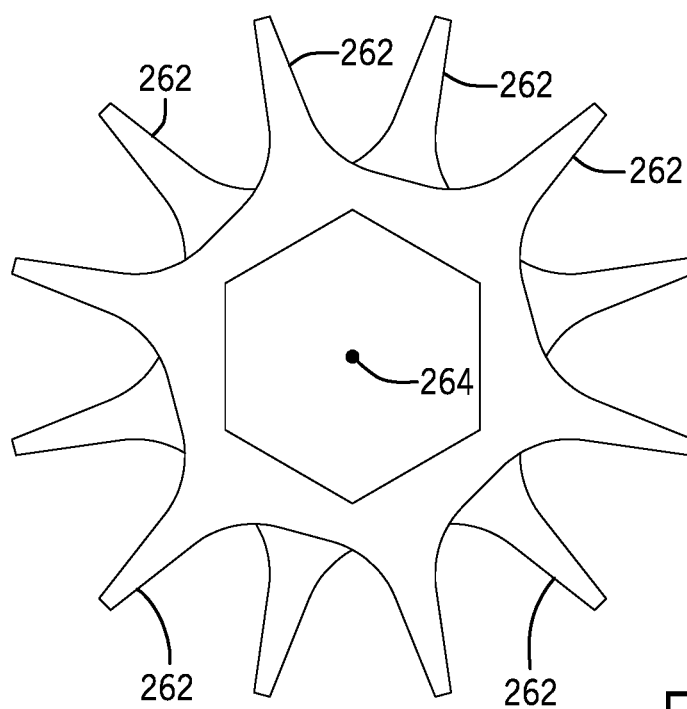
FIG. 15 is an end view of two superimposed roller segments, according to an embodiment of the disclosure.

As illustrated, the fins 262 and the aperture 272 are not aligned. That is, the vertices 274 of the hexagonal aperture 272 do not align with the axis 276 of the respective fins 262. As illustrated, the vertices 274 of the hexagonal aperture 272 are offset from the axis 276 of the proximate fins 262 by the angle 277. In FIG. 14, the vertices 274 of the hexagonal aperture 272 are offset from the axis 276 of the proximate fins 262 by half the angle 273 formed by neighboring fins 262 (i.e., 30°). This offset enables staggering (e.g., half-turn staggering) of the fins 262 of two roller segments 260 by rotating one of the roller segments 260 a 180° about the axis 278 in circumferential direction 280 or 282. Accordingly, two identical roller segments 260 may be manufactured and coupled to the shaft 166 in two configurations. In the first configuration the fins 262 may be aligned with each other along the axis 264. In the second configuration, the fins 262 may be offset (i.e., staggered) from each other along the axis 264, which may reduce pulsing (e.g., vibration) of the modular meter roller 28 as the roller segments 260 rotate. The second configuration is illustrated in FIG. 15 with two superimposed roller segments 260. As illustrated in the second configuration, the fins 262 on the roller segments 260 are spaced apart by 30° about the axis 264. In other words, the fins 262 on a first roller segment bisect the 60° angle between the fins 262 on the second roller segment. Depending on the desired stagger, the angle 277 may be changed to create the desired stagger between the roller segments 260 while still enabling production of identical roller segments 260.

Figure 16:
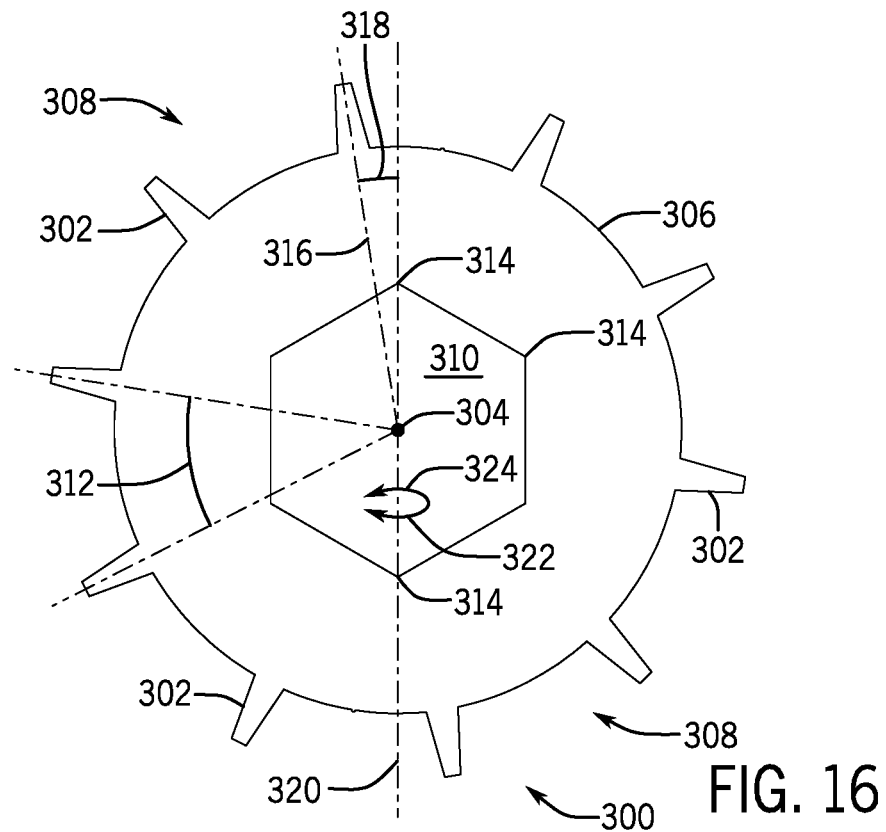
FIG. 16 is an end view of a roller segment, according to an embodiment of the disclosure.

FIG. 16 is a cross-sectional view of a roller segment 300. In FIG. 16, the roller segment 300 includes ten fins 302 equally spaced about an axis 304 (e.g., circumferentially). As illustrated, the fins 302 extend from an outer surface 306 of the roller segment 300, which creates grooves or pockets 308 between the fins 302. The grooves 308 receive the particulate as the roller segment 300 rotates about the axis 304 during operation of the modular meter roller 28. The profile of the roller segment 300 between the fins 302 is convex (e.g., convex surface).

The roller segment 300 defines an aperture 310 that receives the shaft 166 enabling the roller segment 300 to couple to the modular meter roller 28. In FIG. 16, the aperture 310 is in the form of a hexagon. In other embodiments, the aperture 310 may have a different shape (e.g., octagon, decagon) that corresponds to the shape of the shaft 166. As explained above, the fins 302 are equally spaced from each other about the axis 304. The angle 312 between each of the fins 302 is therefore 36°.

The fins 302 and the aperture 310 are not aligned. That is, the vertices 314 of the hexagonal aperture 310 do not all align with the axis 316 of the fins 302. As illustrated, the vertex 314 of the hexagonal aperture 310 are offset from the axis 316 of the proximate fin 302 by the angle 318. In FIG. 16, the angle 318 is half the angle 312 formed by neighboring fins 302 (i.e., 18°). This offset enables staggering (e.g., half-turn staggering) of the fins 302 of two roller segments 300 by rotating one of the roller segments 300 a 180° about the axis 320 in circumferential direction 322 or 324. Accordingly, two identical roller segments 300 may be manufactured and coupled to the shaft 166 in two configurations. In the first configuration, the fins 302 may be aligned with each other along the axis 304. In the second configuration, the fins 302 may be offset (i.e., staggered) between roller segments 300 along the axis 304, which may reduce pulsing (e.g., vibration) of the modular meter roller 28 as the roller segments 300 rotate. Depending on the desired stagger, the angle 318 may be changed to create the desired stagger between the roller segments 300 while still enabling production of identical roller segments 300.

Figure 17:
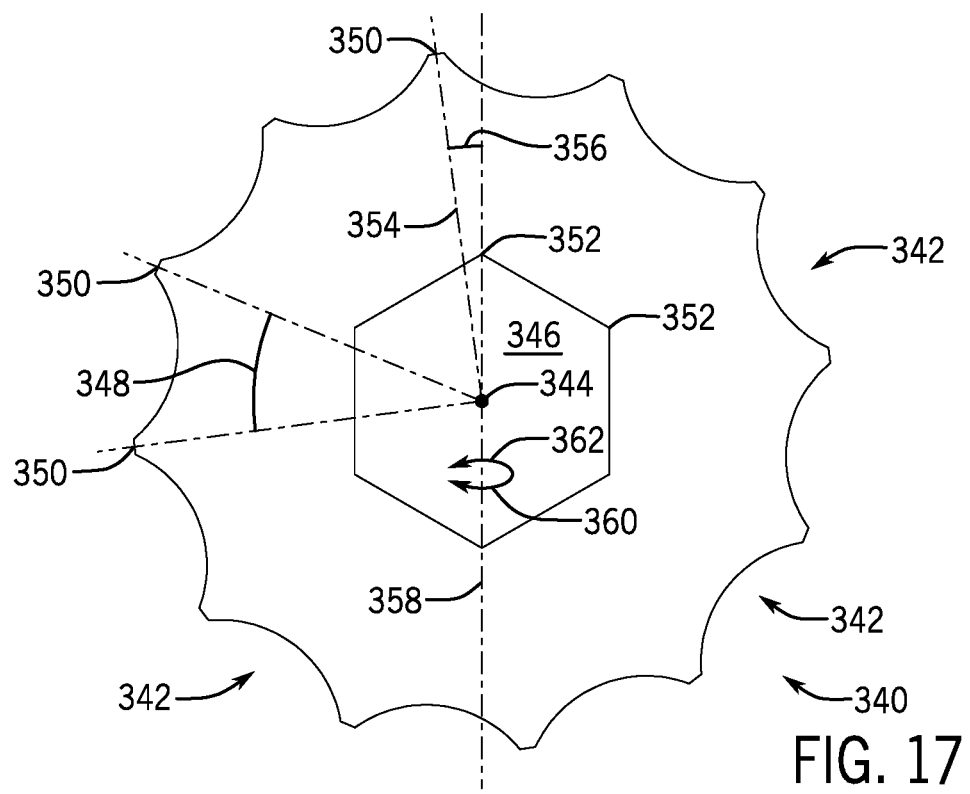
FIG. 17 is an end view of a roller segment, according to an embodiment of the disclosure.

FIG. 17 is a cross-sectional view of a roller segment 340. In FIG. 17, the roller segment 340 includes twelve grooves or flutes 342 equally spaced about an axis 344 (e.g., circumferentially). In operation, the flutes 342 receive the particulate as the roller segment 340 rotates about the axis 344 during operation of the modular meter roller 28.

In order to couple the roller segment 340 to the shaft 166, the roller segment 340 defines an aperture 346 that receives the shaft 166 enabling the roller segment 340 to couple to the modular meter roller 28. In FIG. 17, the aperture 346 is in the form of a hexagon. In other embodiments, the aperture 346 may have a different shape (e.g., octagon, decagon) that corresponds to the shape of the shaft 166. As illustrated, the flutes 342 are equally sized and spaced about the axis 344. The angle 348 between the tips 350 of each of the flutes 342 is therefore 30°.

The tips 350 of the flutes 342 do not align with the aperture 346. That is, the vertices 352 of the hexagonal aperture 346 do not all align with the axis 354 that extends between the flute tips 350 and the axis 344. As illustrated, the vertex 352 of the hexagonal aperture 310 is offset from the axis 354 of the flute tip 350 by the angle 356. In FIG. 17, the angle 356 is half the angle 348 formed between the flute tips 350 (i.e., 15°). This offset enables staggering (e.g., half-turn staggering) of the flutes 342 of two roller segments 340 by rotating one of the roller segments 340 a 180° about the axis 358 in circumferential direction 360 or 362. Accordingly, two identical roller segments 340 may be manufactured and coupled to the shaft 166 in two configurations. In the first configuration the flutes 342 may be aligned with each other along the axis 344. In the second configuration, the flutes 342 may be offset (i.e., staggered) from each other along the axis 344, which may reduce pulsing (e.g., vibration) of the modular meter roller 28 as the roller segments 340 rotate. Again, depending on the desired stagger, the angle 356 may be changed to create the desired stagger between the roller segments 340 while still enabling production of identical roller segments 340.

Figure 18:
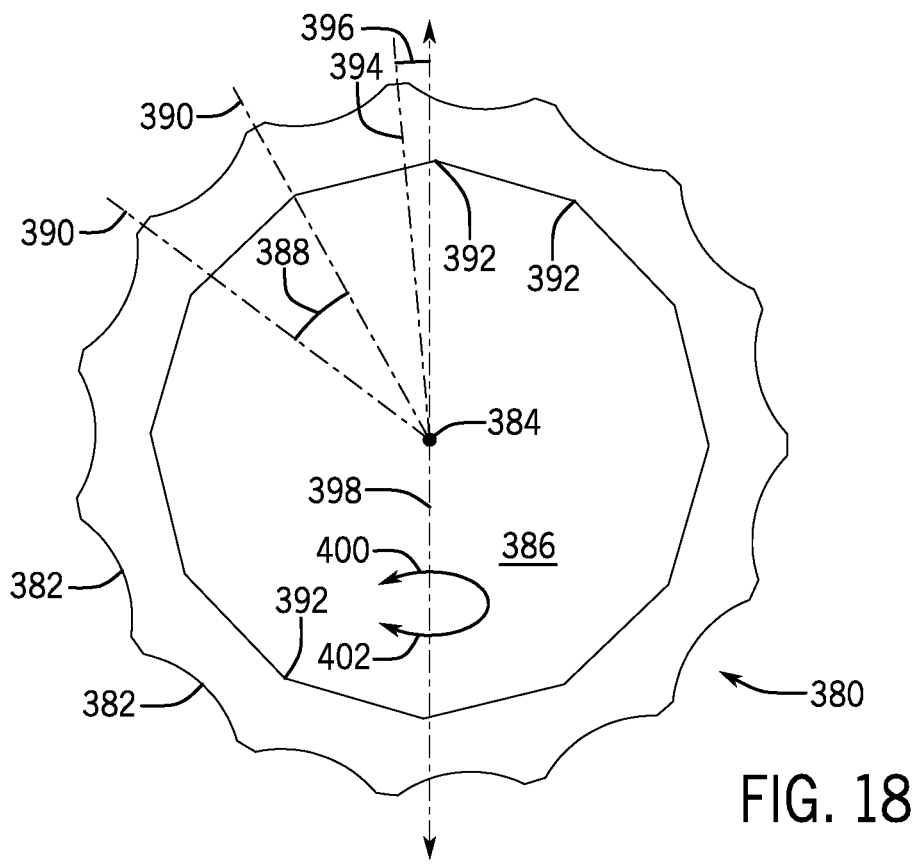
FIG. 18 is an end view of a roller segment, according to an embodiment of the disclosure.

FIG. 18 is a cross-sectional view of a roller segment 380. In FIG. 18, the roller segment 380 includes fifteen grooves or flutes 382 equally spaced about an axis 384 (e.g., circumferentially). In operation, the flutes 382 receive the particulate as the roller segment 380 rotates about the axis 384 during operation of the modular meter roller 28.

In order to couple the roller segment 380 to the shaft 166, the roller segment 380 defines an aperture 386 that receives the shaft 166 enabling the roller segment 380 to couple to the modular meter roller 28. In FIG. 18, the aperture 386 is in the form of a dodecagon. In other embodiments, the aperture 386 may have a different shape (e.g., hexagon, octagon, decagon) that corresponds to the shape of the shaft 166. As illustrated, the flutes 382 are equally sized and spaced about the axis 384. The angle 388 between the tips 390 each of the flutes 382 is therefore 24°.

The number of flutes 382 may not correspond to the shape of the aperture 386 therefore the flutes 382 and the aperture 386 may not align. That is, the vertices 392 of the hexagonal aperture 386 do not all align with the axis 394 that extends between the flute tips 390 and the axis 384 (e.g., central axis of the roller segment 380). As illustrated, the vertex 392 of the aperture 386 is offset from the axis 394 of the flute tip 390 by the angle 396. In FIG. 18, the angle 396 is half the angle 388 formed between the flute tips 390 (i.e., 15°). This offset enables staggering (e.g., half-turn staggering) of the flutes 382 of two roller segments 380 by rotating one of the roller segments 380 a 180° about the axis 398 in circumferential direction 400 or 402. Accordingly, two identical roller segments 380 may be manufactured and coupled to the shaft 166 in two configurations. In the first configuration the flutes 382 may be aligned with each other along the axis 384. In the second configuration, the flutes 382 may be offset (i.e., staggered) from each other along the axis 384, which may reduce pulsing (e.g., vibration) of the modular meter roller 28 as the roller segments 380 rotate. Again, depending on the desired stagger, the angle 396 may be changed to create the desired stagger between the roller segments 380 while still enabling production of identical roller segments 380.

Figure 19:
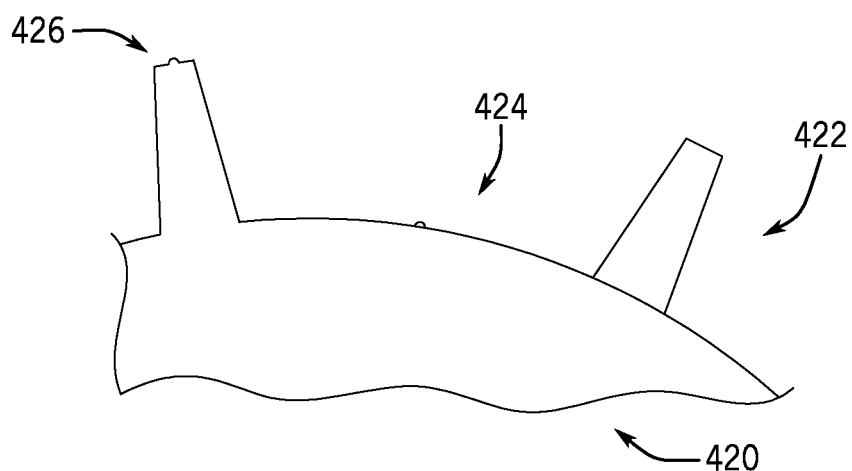
FIG. 19 is a partial end view of a roller segment, according to an embodiment of the disclosure.

FIG. 19 is a partial sectional view of roller segments 420 and 422. As explained above, roller segments (e.g., roller segments 160, 260, 300, 340, and 380) may be staggered, which may reduce pulsing (e.g., vibration) of the modular meter roller 28 and/or the meter system 18. For example, the roller segments in a modular meter roller 28 may be half-staggered wherein either the fins and/or flutes of a first roller segment are misaligned with the fins and/or flutes of a second roller segment such that the fins and/or flutes of the first roller segment are positioned half-way between the fins and/or flutes of the second roller segment along the shaft. As explained above, the roller segments may be staggered by circumferentially rotating the roller segments about a central axis. This enables identical roller segments to manufactured while still enabling staggering of the roller segments. The staggering is formed by misaligning the fins or flute tips of the roller segments along the axis of the shaft.

To facilitate half-staggering the fins and/or flutes, the roller segments 420 and 422 may include respective alignment features 424 and 426. As seen above, some of the roller segments may define an aperture with a shape that does not have the same number of sides as the number of fins or flutes on the roller segment. Accordingly, the number of positions that enable half-staggering of the roller segments may be one or two circumferential positions. For example, if the roller segment aperture is a hexagon and the number of fins and/or flutes can be evenly divided by 6 (e.g., 12, 18) the roller segments can be aligned, in the manner explained above, without alignment features. However, for roller segments having a number of flutes or fins that are not equal to or evenly divided by the number of the faces of the aperture, the alignment features 424, 426 may facilitate half-staggering alignment of the roller segments. For example, the roller segment 300 of FIG. 16 includes an even number of fins 302 (i.e., 10) and will therefore have two locations for alignment with the hexagonal aperture 310. In another example, the roller segment 380 of FIG. 18 includes an odd number of flutes 382 and will therefore have one location for alignment with the dodecagon aperture 386. The alignment features 424 and 426 may be protrusions, markings (e.g., color codes symbols, symbols, letters, numbers, or combinations thereof). In some embodiments, the alignment feature may be placed on a fin, fin tip, top of a flute, body of the roller segment, and/or a combination thereof to facilitate staggering alignment of roller segments.

Figure 20:
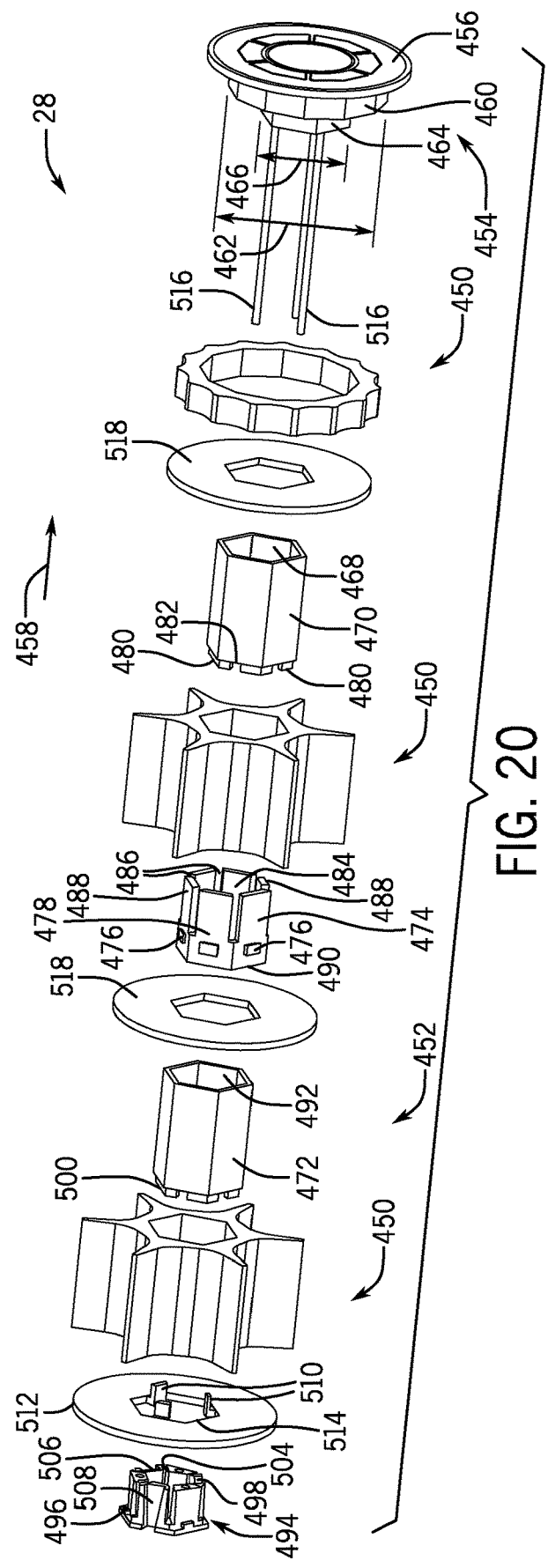
FIG. 20 is an exploded perspective view of a modular meter roller, according to an embodiment of the disclosure.

FIG. 20 is an exploded perspective view of a modular meter roller 28. As explained above, the modular meter roller 28 enables a user to swap/replace roller segments 450 to accommodate metering of different types of product and/or product sizes (e.g., seed, fertilizer). The illustrated modular meter roller 28 includes three separate roller segments 450 that are configured to couple to a modular shaft 452. In other embodiments, the modular meter roller 28 may include a different number of roller segments 450 (e.g., one, two, three, four, five, six). Each of these roller segments 450 may differ from the other roller segments 450 (e.g., number of fins, flutes, groove shape, or a combination thereof). In this way, the modular meter roller 28 may enable metering of different products simultaneously or at different times through the metering system 18. Modularity of the meter roller 28 may also enable the roller segments 450 to couple to the modular shaft 452 in different configurations. That is, the fins and/or flutes of the roller segments 450 may be aligned or staggered when coupled to the modular shaft 452. As explained above, staggering of the roller segments 450 may reduce and/or block pulsing (e.g., vibration) of the modular meter roller 28 and thus vibration of the meter system 18.

In some embodiments, the modular shaft 452 may include multiple sections that accommodate different apertures of the roller segments 450. For example, the modular shaft 452 may include a first section 454. The first section 454 may include an end plate 456 that blocks removal of the roller segments 450 in direction 458. The first section 454 may also include a first shaft portion 460 that receives a roller segment 450. As illustrated, the first shaft portion 460 defines a first diameter 462 that may be greater than other shaft portions. Coupled to the first shaft portion 460 is a second shaft portion 464. The second shaft portion 464 defines a diameter 466. The second shaft portion 464 is configured to be inserted into an aperture 468 of a second shaft section 470. The second shaft section 470 is configured to couple to a third shaft section 472 with a shaft connector 474. In operation, the shaft connector 474 is configured to increase torque transfer from the second shaft section 470 to the third shaft section 472. The shaft connector 474 includes one or more protrusions 476 that extend (e.g., radially extend) from an exterior surface 478. The protrusions 476 are configured to interlock or engage protrusions 480 that extend from an end surface 482 of the second shaft section 470. That is, a first end 484 of the shaft connector 474 is configured to slide into the aperture 468 of the second shaft section 470 to enable the protrusions 476 on the shaft connector 474 to rest in-between the protrusions 480 on the second shaft section 470. In some embodiments, the shaft connector 474 may define one or more slits 486 that enable fingers 488 of the first end 484 to flex radially inward during insertion of the first end 484 into the second shaft section 470.

In order to couple the third shaft section 472 to the shaft connector 474, a second end 490 of the shaft connector 474 slides into an aperture 492 of the third shaft section 472. An end cap 494 completes the modular shaft 452 and couples to the third shaft section 472. The end cap 494 includes one or more protrusions 496 that extend (e.g., extend radially outward) from an exterior surface 498. The protrusions 496 are configured to interlock or engage protrusions 500 that extend from an end surface 502 of the third shaft section 472. In operation, the end cap 494 is configured to slide into the aperture 492 of the third shaft section 472 to enable the protrusions 496 on the end cap 494 to rest in-between the protrusions 500 on the third shaft section 472. In some embodiments, the end cap 494 may define one or more slits 504 that enable fingers 506 on the end cap 494 to flex radially inward during insertion into the third shaft section 472. In some embodiments, the end cap 494 may also define grooves 508 in the exterior surface 498. The grooves 508 may enable the end cap 494 to receive protrusions 510 on an end plate 512. The protrusions 510 of the end plate 512 extend from the interior surface 514 that defines the aperture 515. By receiving the protrusions 510 of the end plate 512, the end cap 494 is able to couple the end plate 512 to the modular shaft 452 and block removal of the roller segments 450. In some embodiments, the modular shaft 452 may include one or more rods 516 (e.g., heat stakes, self-tapping screws, threaded rods) that may extend through the end plate 456, the first shaft portion 460, the second shaft portion 464, the second shaft section 470, the third shaft section 472, and the shaft connector 474 or a subset thereof. After passing through these components of the modular shaft 452, the rods 516 may then couple to the end cap 494. For example, the rods 516 may threadingly couple to the end cap 494. The rods 516 may also be heat stakes that extend through one or more apertures in the end cap 494. After passing through the end cap 494, the heat stakes may then be melted to create a head on the rods 516 that blocks their withdrawal through the one or more apertures in the end cap 494.

As illustrated, the modular shaft 452 may define one or more shapes that correspond to the shape of the apertures on the roller segments 450. For example, the first shaft portion 460 may define a dodecahedron exterior surface profile, while the second and third shaft sections 470 and 472 may define a hexagon exterior surface profile. These exterior surface profiles correspond to the profile of the apertures in the roller segments 450 as well as the discs 518 (e.g., separation discs) and the end plate 512.

Figure 21:
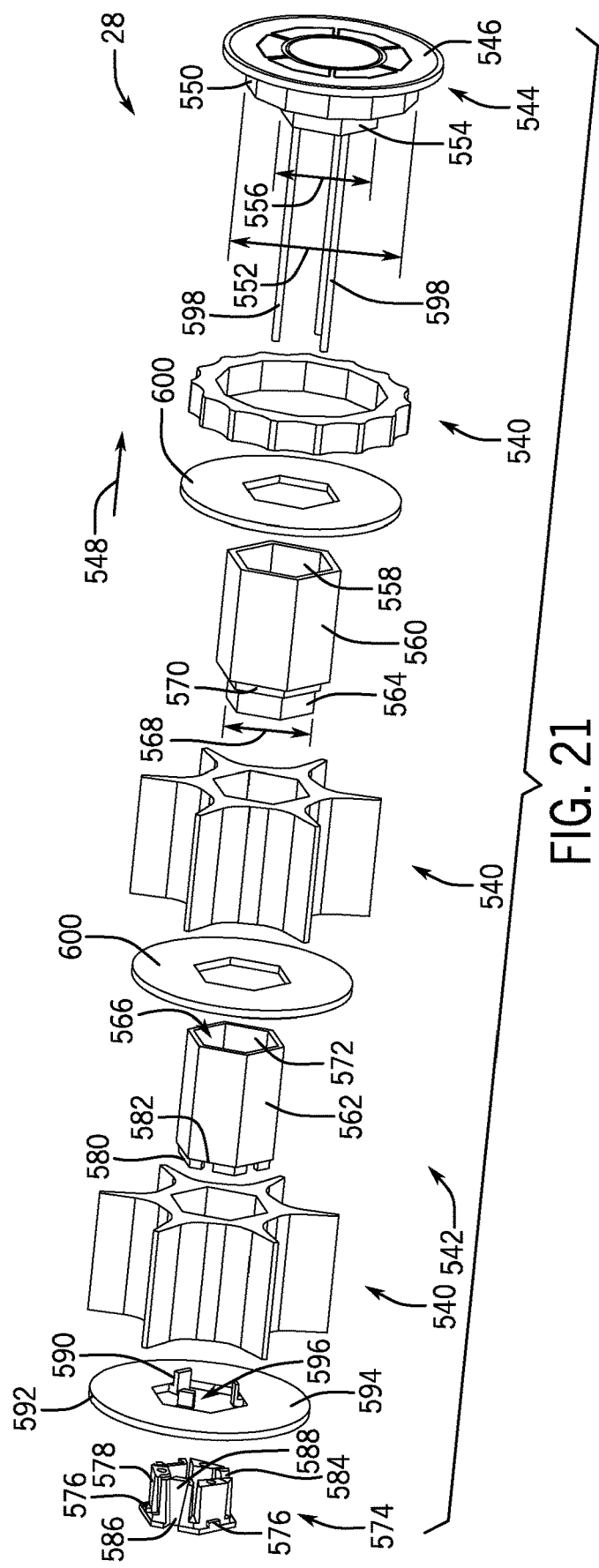
FIG. 21 is an exploded perspective view of a modular meter roller, according to an embodiment of the disclosure.

FIG. 21 is an exploded perspective view of a modular meter roller 28. As explained above, the modular meter roller 28 enables a user to swap/replace roller segments 540 to accommodate metering of different types of product and/or product sizes (e.g., seed, fertilizer). The illustrated modular meter roller 28 includes three separate roller segments 540 that are configured to couple to a modular shaft 542. In other embodiments, the modular meter roller 28 may include a different number of roller segments 540 (e.g., one, two, three, four, five, six). Each of these roller segments 540 may differ from the other roller segments 540 (e.g., number of fins, flutes, groove shape, or a combination thereof). In this way, the modular meter roller 28 may enable metering of different products simultaneously or at different times through the metering system 18. Modularity of the meter roller 28 may also enable the roller segments 540 to couple to the modular shaft 542 in different configurations. That is, the fins and/or flutes of the roller segments 540 may be aligned or staggered when coupled to the modular shaft 542. As explained above, staggering of the roller segments 540 may reduce and/or block pulsing (e.g., vibration) of the modular meter roller 28 and thus vibration of the meter system 18.

In some embodiments, the modular shaft 542 may include multiple sections that accommodate different apertures of the roller segments 540. For example, the modular shaft 542 may include a first section 544. The first section 544 may include an end plate 546 that blocks removal of the roller segments 540 in direction 548. The first section 544 may also include a first shaft portion 550 that receives a roller segment 540. As illustrated, the first shaft portion 550 defines a first diameter 552 that may be greater than other shaft portions. Coupled to the first shaft portion 550 is a second shaft portion 554. The second shaft portion 554 defines a diameter 556. The second shaft portion 554 is configured to be inserted into an aperture 558 of a second shaft section 560. The second shaft section 560 is configured to couple to a third shaft section 562. Specifically, a first end 564 of the second shaft section 560 is configured to be inserted into an aperture 566 of the third shaft section 562. As illustrated, the first end 564 defines a width 568, which is equal to or substantially equal to a width of the aperture 566. The first end 564 is therefore able to slide into the third shaft section 562 until the lip or ledge 570 contacts the end face 572 of the third shaft section 562.

An end cap 574 completes the modular shaft 542 and couples to the third shaft section 562. The end cap 574 includes one or more protrusions 576 that extend (e.g., extend radially outward) from an exterior surface 578. The protrusions 576 are configured to interlock or engage protrusions 580 that extend from an end surface 582 of the third shaft section 562. In operation, the end cap 574 is configured to slide into the aperture 566 of the third shaft section 562 to enable the protrusions 576 on the end cap 574 to rest in between the protrusions 580 on the third shaft section 562. In some embodiments, the end cap 574 may define one or more slits 584 that enable fingers 586 of the end cap 574 to flex radially inward during insertion into the third shaft section 562. In some embodiments, the end cap 574 may also define grooves 588 in the exterior surface 578. The grooves 588 may enable the end cap 574 to receive protrusions 590 on an end plate 592. The protrusions 590 of the end plate 592 extend from the interior surface 594 that defines the aperture 596. By receiving the protrusions 590 of the end plate 592, the end cap 574 is able to couple the end plate 592 to the modular shaft 542 and block removal of the roller segments 540. In some embodiments, the modular shaft 542 may include one or more rods 598 (e.g., heat stakes, self-tapping screws, threaded rods) that may extend through the end plate 546, the first shaft portion 550, the second shaft portion 554, the second shaft section 560, the third shaft section 562, and the shaft connector 564 or a subset thereof. After passing through these components of the modular shaft 542, the rods 598 may then couple to the end cap 574. For example, the rods 598 may threadingly couple to the end cap 574. The rods 598 may also be heat stakes that extend through one or more apertures in the end cap 574. After passing through the end cap 574, the heat stakes may then be melted to create a head on the rods 598 that blocks their withdrawal through the one or more apertures in the end cap 574.

As illustrated, the modular shaft 542 may define one or more shapes that correspond to the shape of the apertures on the roller segments 540. For example, the first shaft portion 550 may define a dodecahedron exterior surface profile, while the second and third shaft sections 560 and 562 may define a hexagon exterior surface profile. These exterior surface profiles correspond to the profile of the apertures in the roller segments 540 as well as the discs 600 (e.g., separation discs) and the end plate 592.

Figure 22:
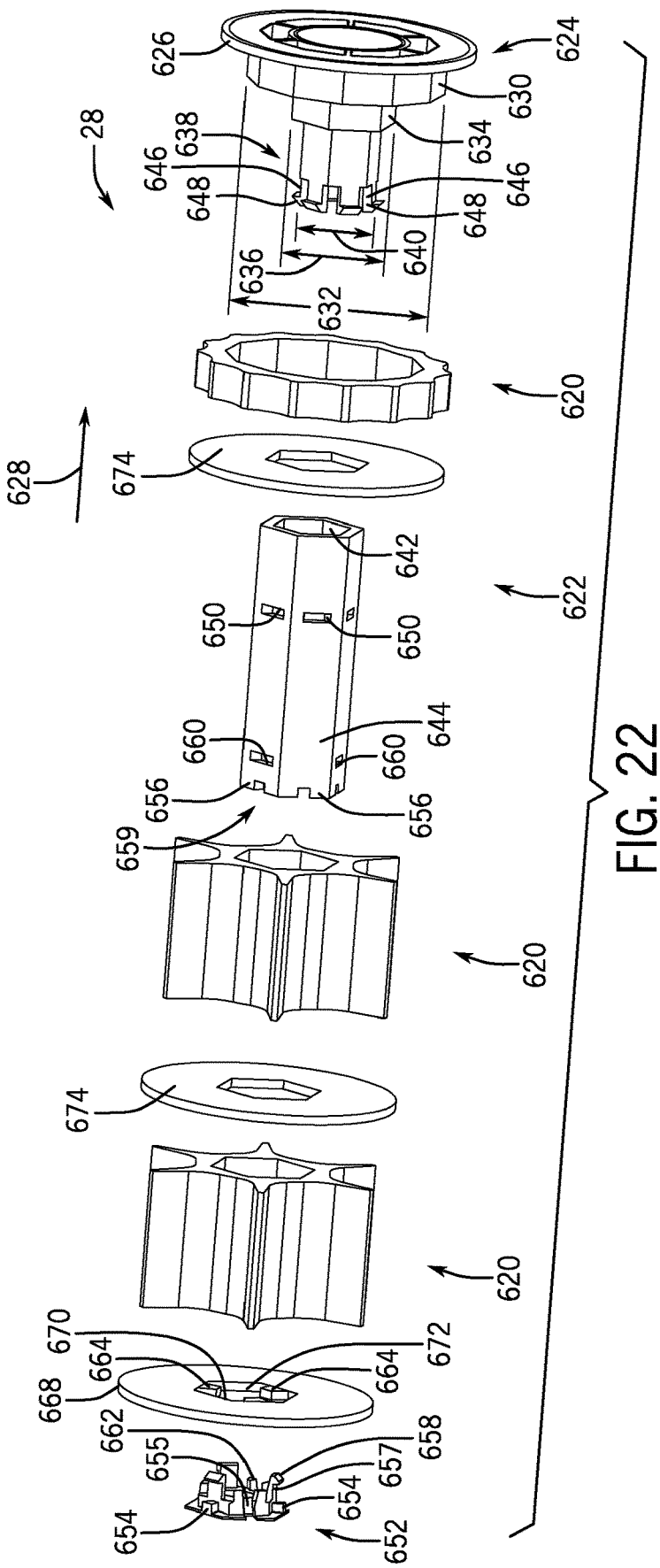
FIG. 22 is an exploded perspective view of a modular meter roller, according to an embodiment of the disclosure.

FIG. 22 is an exploded perspective view of a modular meter roller 28. As explained above, the modular meter roller 28 enables a user to swap/replace roller segments 620 to accommodate metering of different types of product and/or product sizes (e.g., seed, fertilizer). The illustrated modular meter roller 28 includes three separate roller segments 620 that are configured to couple to a modular shaft 622. In other embodiments, the modular meter roller 28 may include a different number of roller segments 620 (e.g., one, two, three, four, five, six). Each of these roller segments 620 may differ from the other roller segments 620 (e.g., number of fins, flutes, groove shape, or a combination thereof). In this way, the modular meter roller 28 may enable metering of different products simultaneously through the metering system 18. Modularity of the meter roller 28 may also enable the roller segments 620 to couple to the modular shaft 622 in different configurations. That is, the fins and/or flutes of the roller segments 620 may be aligned or staggered when coupled to the modular shaft 622. As explained above, staggering of the roller segments 620 may reduce and/or block pulsing (e.g., vibration) of the modular meter roller 28 and thus vibration of the meter system 18.

In some embodiments, the modular shaft 622 may include multiple sections that accommodate different apertures of the roller segments 620. For example, the modular shaft 622 may include a first section 624. The first section 624 may include an end plate 626 that blocks removal of the roller segments 620 in direction 628. The first section 624 may also include a first shaft portion 630 that receives a roller segment 620. As illustrated, the first shaft portion 630 defines a first diameter 632 that may be greater than other shaft portions and/or sections. Coupled to the first shaft portion 630 is a second shaft portion 634. The second shaft portion 634 defines a diameter 636. The second shaft portion 634 in turn couples to a shaft connector 638. The shaft connector 638 defines a width 640. The shaft connector 638 is configured to be inserted into an aperture 642 of a second shaft section 644. In some embodiments, the shaft connector 638 may include one or more arms or fingers 646 with protrusions 648. The arms 646 are configured to flex radially inward as the shaft connector 638 is inserted into the second shaft section 644. The arms 646 slide into the second shaft section 644 until the protrusions 648 align with the apertures 650 in the second shaft section 644. Once the protrusions 648 align with the apertures 650, the arms 646 drive the protrusions 648 radially outward and into the apertures 650 forming a connection (e.g., snapfit connection) between the first shaft section 624 and the second shaft section 644.

An end cap 652 completes the modular shaft 622 and couples to the second shaft section 644. The end cap 652 includes one or more protrusions 654 that extend (e.g., extend radially outward) from an exterior surface 655. The protrusions 654 are configured to interlock or engage protrusions 656 that extend from an end surface 659 of the second shaft section 644. In operation, the end cap 652 is configured to slide into the aperture 642 of the second shaft section 644 to enable the protrusions 654 on the end cap 652 to rest in between the protrusions 656 on the second shaft section 644. In some embodiments, the end cap 652 may include one or more fingers 657 that flex radially inward during insertion into the second shaft section 644. The fingers 657 include protrusions 658 that are configured to be inserted into the apertures 660 in the second shaft section 644. Once the protrusions 658 align with the apertures 660, the fingers 657 drive the protrusions 658 radially outward and into the apertures 660 forming a connection (e.g., snapfit connection) between the end cap 652 and the second shaft section 644.

In some embodiments, the end cap 652 may also define grooves 662 in the exterior surface 655. The grooves 662 may enable the end cap 652 to receive protrusions 664 on an end plate 668. The protrusions 664 of the end plate 668 extend from the interior surface 670 that defines the aperture 672. By receiving the protrusions 664 of the end plate 668, the end cap 652 is able to couple the end plate 668 to the modular shaft 622 and block removal of the roller segments 620. As illustrated, the modular shaft 622 may define one or more shapes that correspond to the shape of the apertures on the roller segments 620. For example, the first shaft portion 630 may define a dodecahedron exterior surface profile, while the second shaft section 644 may define a hexagon exterior surface profile. These exterior surface profiles correspond to the profile of the apertures in the roller segments 620 as well as the discs 674 (e.g., separation discs) and the end plate 668.

Figure 23:
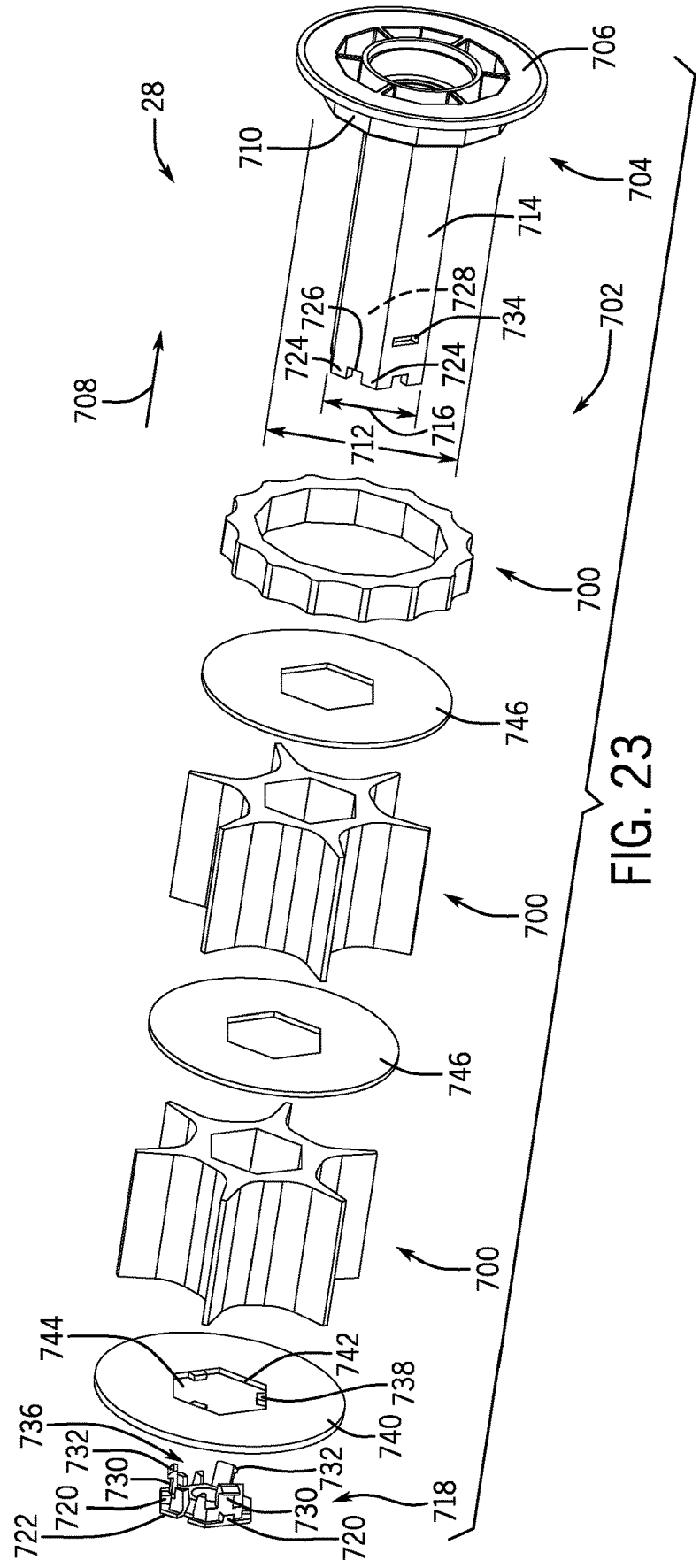
FIG. 23 is an exploded perspective view of a modular meter roller, according to an embodiment of the disclosure.

FIG. 23 is an exploded perspective view of a modular meter roller 28. As explained above, the modular meter roller 28 enables a user to swap/replace roller segments 700 to accommodate metering of different types of product and/or product sizes (e.g., seed, fertilizer). The illustrated modular meter roller 28 includes three separate roller segments 700 that are configured to couple to a modular shaft 702. In other embodiments, the modular meter roller 28 may include a different number of roller segments 700 (e.g., one, two, three, four, five, six). Each of these roller segments 700 may differ from the other roller segments 700 (e.g., number of fins, flutes, groove shape, or a combination thereof). In this way, the modular meter roller 28 may enable metering of different products simultaneously or at different times through the metering system 18. Modularity of the meter roller 28 may also enable the roller segments 700 to couple to the modular shaft 702 in different configurations. That is, the fins and/or flutes of the roller segments 700 may be aligned or staggered when coupled to the modular shaft 702. As explained above, staggering of the roller segments 700 may reduce and/or block pulsing (e.g., vibration) of the modular meter roller 28 and thus vibration of the meter system 18.

In some embodiments, the modular shaft 702 may include multiple sections that accommodate different apertures of the roller segments 700. For example, the modular shaft 702 may include a first section 704. The first section 704 may include an end plate 706 that blocks removal of the roller segments 700 in direction 708. The first section 704 may also include a first shaft portion 710 that receives a roller segment 700. As illustrated, the first shaft portion 710 defines a first diameter 712 that may be greater than other shaft portions and/or sections. Coupled to the first shaft portion 710 is a second shaft portion 714. The second shaft portion 714 defines a diameter 716.

The second shaft portion 714 couples to an end cap 718 to complete the modular shaft 702. The end cap 718 includes one or more protrusions 720 that extend (e.g., extend radially outward) from an exterior surface 722. The protrusions 720 are configured to interlock or engage protrusions 724 that extend from an end surface 726 of the second shaft portion 714. In operation, the end cap 718 is configured to slide into the aperture 728 of the second shaft portion 714 to enable the protrusions 720 on the end cap 718 to rest in between the protrusions 724 on the second shaft portion 714. In some embodiments, the end cap 718 may include one or more fingers 730 that flex radially inward during insertion into the second shaft portion 714. The fingers 730 include protrusions 732 that are configured to be inserted into the apertures 734 in the second shaft portion 714. Once the protrusions 720 align with the apertures 734, the fingers 730 drive the protrusions 732 radially outward and into the apertures 734 forming a connection (e.g., snapfit connection) between the end cap 718 and the second shaft portion 714.

In some embodiments, the end cap 718 may also define grooves 736 in the exterior surface 722. The grooves 736 may enable the end cap 718 to receive protrusions 738 on an end plate 740. The protrusions 738 of the end plate 740 extend from the interior surface 742 that defines the aperture 744. By receiving the protrusions 738 of the end plate 740, the end cap 718 is able to couple the end plate 740 to the modular shaft 702 and block removal of the roller segments 700. As illustrated, the modular shaft 702 may define one or more shapes that correspond to the shape of the apertures on the roller segments 700. For example, the first shaft portion 710 may define a dodecahedron exterior surface profile, while the second shaft portion 714 may define a hexagon exterior surface profile. These exterior surface profiles correspond to the profile of the apertures in the roller segments 700 as well as the discs 746 (e.g., separation discs) and the end plate 740.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A modular meter roller for an agricultural metering system, comprising:
   a shaft configured to be driven in rotation;
   a first roller segment, the first roller segment defining a first aperture configured to receive the shaft, the first roller segment defines a plurality of fins separated by a plurality of grooves, and wherein the first roller segment is configured to receive and meter flowable particulate material in a groove via rotation of the shaft;
   a first end plate coupled to the shaft, wherein the first end plate is configured to block removal of the first roller segment in a first axial direction, wherein the first end plate extends at least half way between a bottom of the plurality of grooves and a distal end of the plurality of fins, and wherein the first end plate is configured to couple to and extend between adjacent fins; and
   a second end plate configured to removable couple to the shaft, wherein the second end plate is configured to enable an exchange of the first roller segment with a second roller segment and to block removal of the first roller segment in a second axial direction during operation of the modular meter roller.

2. The modular meter roller of claim 1, wherein the second end plate couples to the shaft with one or more fasteners.

3. The modular meter roller of claim 1, wherein the shaft and the first end plate are one-piece.

4. The modular meter roller of claim 1, wherein a profile of the shaft is non-circular.

5. The modular meter roller of claim 1, wherein the shaft comprises a first shaft portion with a first width and a second shaft portion with a second width, and wherein the first width and the second width are different.

6. The modular meter roller of claim 1, wherein the shaft comprises a first shaft portion with a first length and a second shaft portion with a second length, and wherein the first length and the second length are different.

7. The modular meter roller of claim 1, wherein the first roller segment comprises a first profile and the second roller segment comprises a second profile.

8. The modular meter roller of claim 1, wherein the shaft is configured to simultaneously support a plurality of roller segments.

9. The modular meter roller of claim 8, comprising a separation plate configured to separate one or more of the plurality of roller segments from the remaining roller segments.

10. The modular meter roller of claim 9, wherein the separation plate defines a second aperture that receives the shaft.

* * * * *